US010686669B2

(12) United States Patent
Nagarajan et al.

(10) Patent No.: US 10,686,669 B2
(45) Date of Patent: Jun. 16, 2020

(54) COLLECTING NETWORK MODELS AND NODE INFORMATION FROM A NETWORK

(71) Applicant: Cisco Technology, Inc., San Jose, CA (US)

(72) Inventors: Chandra Nagarajan, Fremont, CA (US); Divjyot Sethi, Fremont, CA (US); Ramana Rao Kompella, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 192 days.

(21) Appl. No.: 15/663,582

(22) Filed: Jul. 28, 2017

(65) Prior Publication Data
US 2018/0367416 A1    Dec. 20, 2018

Related U.S. Application Data

(60) Provisional application No. 62/520,670, filed on Jun. 16, 2017.

(51) Int. Cl.
*H04L 12/24*      (2006.01)
*H04L 29/08*      (2006.01)
*H04L 12/26*      (2006.01)

(52) U.S. Cl.
CPC ........ *H04L 41/145* (2013.01); *H04L 41/0853* (2013.01); *H04L 41/0866* (2013.01);
(Continued)

(58) Field of Classification Search
CPC ... H04L 41/145; H04L 41/12; H04L 41/0853; H04L 67/34; H04L 41/0866; H04L 41/20;
(Continued)

(56) References Cited

U.S. PATENT DOCUMENTS 5,204,829 A    4/1993 Lyu et al.
6,523,035 B1 *  2/2003 Fleming ............... G06F 16/252
                                                                707/770
(Continued)

FOREIGN PATENT DOCUMENTS

CN    105471830    4/2016
CN    105721193    6/2016
(Continued)

OTHER PUBLICATIONS

International Search Report and Written Opinion, dated Sep. 5, 2018, 14 pages, from the International Searching Authority, for the corresponding International Application No. PCT/US2018/037475.
(Continued)

*Primary Examiner* — Michael Won
(74) *Attorney, Agent, or Firm* — POLSINELLI PC

(57) ABSTRACT

Systems, methods, and computer-readable media for collecting node information from a fabric and generating models based on the node information. In some examples, a system can obtain, from one or more controllers in a software-defined network (SDN), a logical model of the SDN, the logical model containing objects configured for the SDN from a hierarchical management information tree (MIT) associated with the SDN and representing configurations of the objects, the hierarchical MIT defining manageable objects and object properties for the SDN, the objects corresponding to the manageable objects. The system can obtain a topological model of a fabric associated with the SDN and, based on the topological model, poll nodes in the fabric for respective configurations at the nodes. Based on the respective configurations, the system can generate a node-specific representation of the logical model, the node-specific representation projecting the logical model on each node.

18 Claims, 19 Drawing Sheets

(52) U.S. Cl.
CPC .............. *H04L 41/12* (2013.01); *H04L 41/20* (2013.01); *H04L 67/34* (2013.01); *H04L 41/044* (2013.01); *H04L 41/0873* (2013.01); *H04L 41/0893* (2013.01); *H04L 41/147* (2013.01); *H04L 43/10* (2013.01)

(58) Field of Classification Search
CPC . H04L 41/0873; H04L 41/044; H04L 41/147; H04L 41/0893; H04L 43/10
See application file for complete search history.

(56) References Cited

U.S. PATENT DOCUMENTS

| | | | |
|---|---|---|---|
| 6,535,227 B1* | 3/2003 | Fox ........................ | H04L 41/20 709/223 |
| 6,763,380 B1 | 7/2004 | Mayton et al. | |
| 7,003,562 B2 | 2/2006 | Mayer | |
| 7,089,369 B2 | 8/2006 | Emberling | |
| 7,127,686 B2 | 10/2006 | Drechsler et al. | |
| 7,328,260 B1* | 2/2008 | Muthiyan ........... | H04L 41/0681 709/220 |
| 7,360,064 B1 | 4/2008 | Steiss et al. | |
| 7,453,886 B1 | 11/2008 | Allan | |
| 7,505,463 B2 | 3/2009 | Schuba et al. | |
| 7,548,967 B2 | 6/2009 | Amyot et al. | |
| 7,552,201 B2 | 6/2009 | Areddu et al. | |
| 7,609,647 B2 | 10/2009 | Turk et al. | |
| 7,619,989 B2 | 11/2009 | Guingo et al. | |
| 7,698,561 B2 | 4/2010 | Nagendra et al. | |
| 7,743,274 B2 | 6/2010 | Langford et al. | |
| 7,765,093 B2 | 7/2010 | Li et al. | |
| 8,010,952 B2 | 8/2011 | Datla et al. | |
| 8,019,838 B2* | 9/2011 | Jiang ................... | H04L 41/0806 370/225 |
| 8,073,935 B2 | 12/2011 | Viswanath | |
| 8,103,480 B2 | 1/2012 | Korn et al. | |
| 8,190,719 B2 | 5/2012 | Furukawa | |
| 8,209,738 B2 | 6/2012 | Nicol et al. | |
| 8,261,339 B2 | 9/2012 | Aldridge et al. | |
| 8,312,261 B2 | 11/2012 | Rao et al. | |
| 8,375,117 B2 | 2/2013 | Venable, Sr. | |
| 8,441,941 B2 | 5/2013 | McDade et al. | |
| 8,479,267 B2 | 7/2013 | Donley et al. | |
| 8,484,693 B2 | 7/2013 | Cox et al. | |
| 8,494,977 B1 | 7/2013 | Yehuda et al. | |
| 8,554,883 B2 | 8/2013 | Sankaran | |
| 8,589,934 B2 | 11/2013 | Makljenovic et al. | |
| 8,621,284 B2 | 12/2013 | Kato | |
| 8,627,328 B2 | 1/2014 | Mousseau et al. | |
| 8,693,344 B1 | 4/2014 | Adams et al. | |
| 8,761,036 B2 | 6/2014 | Fulton et al. | |
| 8,782,182 B2 | 7/2014 | Chaturvedi et al. | |
| 8,824,482 B2 | 9/2014 | Kajekar et al. | |
| 8,910,143 B2 | 12/2014 | Cohen et al. | |
| 8,914,843 B2 | 12/2014 | Bryan et al. | |
| 8,924,798 B2 | 12/2014 | Jerde et al. | |
| 9,019,840 B2 | 4/2015 | Salam et al. | |
| 9,038,151 B1 | 5/2015 | Chua et al. | |
| 9,055,000 B1 | 6/2015 | Ghosh et al. | |
| 9,106,555 B2 | 8/2015 | Agarwal et al. | |
| 9,137,096 B1 | 9/2015 | Yehuda et al. | |
| 9,225,601 B2 | 12/2015 | Khurshid et al. | |
| 9,246,818 B2 | 1/2016 | Deshpande et al. | |
| 9,264,922 B2 | 2/2016 | Gillot et al. | |
| 9,276,877 B1 | 3/2016 | Chua et al. | |
| 9,319,300 B2 | 4/2016 | Huynh Van et al. | |
| 9,344,348 B2 | 5/2016 | Ivanov et al. | |
| 9,369,434 B2 | 6/2016 | Kim et al. | |
| 9,389,993 B1 | 7/2016 | Okmyanskiy et al. | |
| 9,405,553 B2 | 8/2016 | Branson et al. | |
| 9,444,842 B2 | 9/2016 | Porras et al. | |
| 9,497,207 B2 | 11/2016 | Dhawan et al. | |
| 9,497,215 B2 | 11/2016 | Vasseur et al. | |
| 9,544,224 B2 | 1/2017 | Chu et al. | |
| 9,548,965 B2 | 1/2017 | Wang et al. | |
| 9,553,845 B1 | 1/2017 | Talmor et al. | |
| 9,571,502 B2 | 2/2017 | Basso et al. | |
| 9,571,523 B2 | 2/2017 | Porras et al. | |
| 9,594,640 B1 | 3/2017 | Chheda | |
| 9,596,141 B2 | 3/2017 | McDowall | |
| 9,641,249 B2 | 5/2017 | Kaneriya et al. | |
| 9,654,300 B2 | 5/2017 | Pani | |
| 9,654,361 B2 | 5/2017 | Vasseur et al. | |
| 9,654,409 B2 | 5/2017 | Yadav et al. | |
| 9,660,886 B1 | 5/2017 | Ye et al. | |
| 9,667,645 B1 | 5/2017 | Belani et al. | |
| 9,680,875 B2 | 6/2017 | Knjazihhin et al. | |
| 9,686,180 B2 | 6/2017 | Chu et al. | |
| 9,690,644 B2 | 6/2017 | Anderson et al. | |
| 9,781,004 B2 | 10/2017 | Danait et al. | |
| 10,218,572 B2* | 2/2019 | Pani ..................... | H04L 41/0853 |
| 2002/0143855 A1 | 10/2002 | Traversat et al. | |
| 2003/0229693 A1 | 12/2003 | Mahlik et al. | |
| 2004/0042416 A1* | 3/2004 | Ngo ....................... | H04L 12/467 370/254 |
| 2004/0073647 A1 | 4/2004 | Gentile et al. | |
| 2004/0168100 A1 | 8/2004 | Thottan et al. | |
| 2005/0108389 A1 | 5/2005 | Kempin et al. | |
| 2005/0193245 A1* | 9/2005 | Hayden ............... | G06F 11/2069 714/13 |
| 2007/0124437 A1 | 5/2007 | Chervets | |
| 2007/0214244 A1 | 9/2007 | Hitokoto et al. | |
| 2008/0031147 A1 | 2/2008 | Fieremans et al. | |
| 2008/0117827 A1 | 5/2008 | Matsumoto et al. | |
| 2008/0133731 A1 | 6/2008 | Bradley et al. | |
| 2008/0172716 A1 | 7/2008 | Talpade et al. | |
| 2009/0240758 A1 | 9/2009 | Pasko et al. | |
| 2009/0249284 A1 | 10/2009 | Antosz et al. | |
| 2010/0191612 A1 | 7/2010 | Raleigh | |
| 2010/0198909 A1 | 8/2010 | Kosbab et al. | |
| 2010/0312913 A1* | 12/2010 | Wittenschlaeger ....... | G06F 9/54 709/238 |
| 2011/0093612 A1 | 4/2011 | Murakami | |
| 2011/0107250 A1* | 5/2011 | Boykin .................. | G06Q 10/10 715/772 |
| 2011/0295983 A1 | 12/2011 | Medved et al. | |
| 2012/0054163 A1 | 3/2012 | Liu et al. | |
| 2012/0158391 A1* | 6/2012 | Vaske .................. | G06F 16/2219 703/11 |
| 2012/0198073 A1 | 8/2012 | Srikanth et al. | |
| 2012/0297061 A1 | 11/2012 | Pedigo et al. | |
| 2013/0097660 A1 | 4/2013 | Das et al. | |
| 2014/0019597 A1 | 1/2014 | Nath et al. | |
| 2014/0222996 A1 | 8/2014 | Vasseur et al. | |
| 2014/0222998 A1* | 8/2014 | Vasseur ................... | H04L 41/16 709/224 |
| 2014/0279808 A1* | 9/2014 | Strassner .............. | G06Q 10/06 706/47 |
| 2014/0304831 A1 | 10/2014 | Hidlreth et al. | |
| 2014/0307556 A1 | 10/2014 | Zhang | |
| 2014/0321277 A1 | 10/2014 | Lynn, Jr. et al. | |
| 2014/0379915 A1 | 12/2014 | Yang et al. | |
| 2015/0019756 A1 | 1/2015 | Masuda | |
| 2015/0124826 A1 | 5/2015 | Edsall et al. | |
| 2015/0244617 A1 | 8/2015 | Nakil et al. | |
| 2015/0263916 A1* | 9/2015 | Phillips ................... | H04L 43/08 709/224 |
| 2015/0271104 A1 | 9/2015 | Chikkamath et al. | |
| 2015/0365314 A1 | 12/2015 | Hiscock et al. | |
| 2016/0020993 A1 | 1/2016 | Wu et al. | |
| 2016/0026631 A1 | 1/2016 | Salam et al. | |
| 2016/0036636 A1 | 2/2016 | Erickson et al. | |
| 2016/0050125 A1* | 2/2016 | Mattson .............. | H04L 41/5051 709/225 |
| 2016/0078220 A1 | 3/2016 | Scharf et al. | |
| 2016/0080350 A1 | 3/2016 | Chaturvedi et al. | |
| 2016/0099883 A1 | 4/2016 | Voit et al. | |
| 2016/0149751 A1 | 5/2016 | Pani et al. | |
| 2016/0164748 A1 | 6/2016 | Kim | |
| 2016/0241436 A1 | 8/2016 | Fourie et al. | |
| 2016/0254964 A1 | 9/2016 | Benc | |
| 2016/0267384 A1 | 9/2016 | Salam et al. | |

(56) References Cited

U.S. PATENT DOCUMENTS

| | | | |
|---|---|---|---|
| 2016/0352566 A1 | 12/2016 | Mekkattuparamban et al. | |
| 2016/0380892 A1 | 12/2016 | Mahadevan et al. | |
| 2017/0005868 A1* | 1/2017 | Scheines | H04L 67/26 |
| 2017/0026292 A1 | 1/2017 | Smith et al. | |
| 2017/0048110 A1 | 2/2017 | Wu et al. | |
| 2017/0048126 A1 | 2/2017 | Handige Shankar et al. | |
| 2017/0063599 A1 | 3/2017 | Wu et al. | |
| 2017/0093630 A1 | 3/2017 | Foulkes | |
| 2017/0093664 A1 | 3/2017 | Lynam et al. | |
| 2017/0093750 A1 | 3/2017 | McBride et al. | |
| 2017/0093918 A1 | 3/2017 | Banerjee et al. | |
| 2017/0111259 A1 | 4/2017 | Wen et al. | |
| 2017/0118167 A1 | 4/2017 | Subramanya et al. | |
| 2017/0126740 A1 | 5/2017 | Bejarano Ardila et al. | |
| 2017/0126792 A1 | 5/2017 | Halpern et al. | |
| 2017/0134233 A1 | 5/2017 | Dong et al. | |
| 2017/0163442 A1 | 6/2017 | Shen et al. | |
| 2017/0187577 A1 | 6/2017 | Nevrekar et al. | |
| 2017/0195187 A1 | 7/2017 | Bennett et al. | |
| 2017/0206129 A1 | 7/2017 | Yankilevich et al. | |
| 2017/0353355 A1 | 12/2017 | Danait et al. | |
| 2018/0309629 A1* | 10/2018 | Mohanram | H04L 41/0873 |
| 2018/0309632 A1* | 10/2018 | Kompella | H04L 41/145 |
| 2018/0309640 A1* | 10/2018 | Nagarajan | H04L 41/145 |
| 2018/0351806 A1* | 12/2018 | Mohanram | H04L 41/0823 |
| 2018/0351820 A1* | 12/2018 | Nagarajan | H04L 41/145 |
| 2018/0351821 A1* | 12/2018 | Nagarajan | H04L 41/0823 |
| 2018/0367412 A1* | 12/2018 | Sethi | H04L 41/12 |

FOREIGN PATENT DOCUMENTS

| | | |
|---|---|---|
| CN | 105721297 | 6/2016 |
| CN | 106130766 | 11/2016 |
| CN | 106603264 | 4/2017 |
| CN | 103701926 | 6/2017 |
| WO | WO 2015/014177 | 2/2015 |
| WO | WO 2015/187337 | 12/2015 |
| WO | WO 2016/011888 | 1/2016 |
| WO | WO 2016/039730 | 3/2016 |
| WO | WO 2016/072996 | 5/2016 |
| WO | WO 2016/085516 | 6/2016 |
| WO | WO 2016/093861 | 6/2016 |
| WO | WO 2016/119436 | 8/2016 |
| WO | WO 2016/130108 | 8/2016 |
| WO | 2016/161127 A1 | 10/2016 |
| WO | WO 2017/031922 | 3/2017 |
| WO | WO 2017/039606 | 3/2017 |
| WO | WO 2017/105452 | 6/2017 |

OTHER PUBLICATIONS

Cisco Systems, Inc., "The Cisco Application Policy Infrastructure Controller Introduction: What is the Cisco Application Policy Infrastructure Controller?" Jul. 31, 2014, 19 pages.
Author Unknown, "Aids to Pro-active Management of Distributed Resources through Dynamic Fault-Localization and Availability Prognosis," FaultLocalization-TR01-CADlab, May 2006, pp. 1-9.
Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.
Cisco, "Verify Contracts and Rules in the ACI Fabric," Cisco, Updated Aug. 19, 2016, Document ID: 119023, pp. 1-20.
De Silva et al., "Network-wide Security Analysis," Semantic Scholar, Oct. 25, 2011, pp. 1-11.
Fayaz, Seyed K., et al., "Efficient Network Reachability Analysis using a Succinct Control Plane Representation," 2016, ratul.org, pp. 1-16.
Feldmann, Anja, et al., "IP Network Configuration for Intradomain Traffic Engineering," Semantic Scholar, accessed on Jul. 20, 2017, pp. 1-27.
Han, Yoonseon, et al., "An Intent-based Network Virtualization Platform for SDN," 2016 I FIP, pp. 1-6.
Han, Wonkyu, et al., "LPM: Layered Policy Management for Software-Defined Networks," Mar. 8, 2016, pp. 1-8.
Kazemian, Peyman, et al., "Real Time Network Policy Checking using Header Space Analysis," USENIX Association, 10th USENIX Symposium on Networked Systems Design and Implementation (NSDI '13) pp. 99-111.
Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.
Le, Franck, et al., "Minerals: Using Data Mining to Detect Router Misconfigurations," CyLab, Carnegie Mellon University, CMU-CyLab-06-008, May 23, 2006, pp. 1-14.
Liang, Chieh-Jan Mike, et al., "SIFT: Building an Internet of Safe Things," Microsoft, IPSN' 15, Apr. 14-16, 2015, Seattle, WA, ACM 978, pp. 1-12.
Liu, Jason, et al., "A Real-Time Network Simulation Infrastructure Based on Open VPN," Journal of Systems and Software, Aug. 4, 2008, pp. 1-45.
Lopes, Nuno P., et al., "Automatically verifying reachability and well-formedness in P4 Networks," Microsoft, accessed on Jul. 18, 2017, pp. 1-13.
Mai, Haohui, et al., "Debugging the Data Plane with Anteater," SIGCOMM11, Aug. 15-19, 2011, pp. 1-12.
Miller, Nancy, et al., "Collecting Network Status Information for Network-Aware Applications," INFOCOM 2000, pp. 1-10.
Miranda, Joao Sales Henriques, "Fault Isolation in Software Defined Networks," www.gsd.inescid.pt, pp. 1-10.
Moon, Daekyeong, et al., "Bridging the Software/Hardware Forwarding Divide," Berkeley.edu, Dec. 18, 2010, pp. 1-15.
Shin, Seugwon, et al., "FRESCO: Modular Composable Security Services for Software-Defined Networks," To appear in the ISOC Network and Distributed System Security Symposium, Feb. 2013, pp. 1-16.
Shukla, Apoorv, et al., "Towards meticulous data plane monitoring," kaust.edu.sa, access on Aug. 1, 2017, pp. 1-2.
Tang, Yongning, et al., "Automatic belief network modeling via policy inference for SDN fault localization," Journal of Internet Services and Applications, 2016, pp. 1-13.
Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.
Tongaonkar, Alok, et al., "Inferring Higher Level Policies from Firewall Rules," Proceedings of the 21st Large Installation System Administration Conference (LISA '07), Nov. 11-16, 2007, pp. 1-14.
Zhou, Shijie, et al., "High-Performance Packet Classification on GPU," 2014 IEEE, pp. 1-6.
Akella, Aditya, et al., "A Highly Available Software Defined Fabric," HotNets-XIII, Oct. 27-28, 2014, Los Angeles, CA, USA, Copyright 2014, ACM, pp. 1-7.
Alsheikh, Mohammad Abu, et al., "Machine Learning in Wireless Sensor Networks: Algorithms, Strategies, and Application," Mar. 19, 2015, pp. 1-23.
Cisco Systems, Inc., "Cisco Application Centric Infrastructure 9ACI Endpoint Groups (EPG) Usange and Design," White Paper, May 2014, pp. 1-14.
Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.
Lindem, A., et al., "Network Device YANG Organizational Model draft-rtgyangdt-rtgwg-device-model-01," Network Working Group, Internet-draft, Sep. 21, 2015, pp. 1-33.
Panda, Aurojit, et al., "SCL: Simplifying Distributed SDN Control Planes," people.eecs.berkeley.edu, Mar. 2017, pp. 1-17.
Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

\* cited by examiner

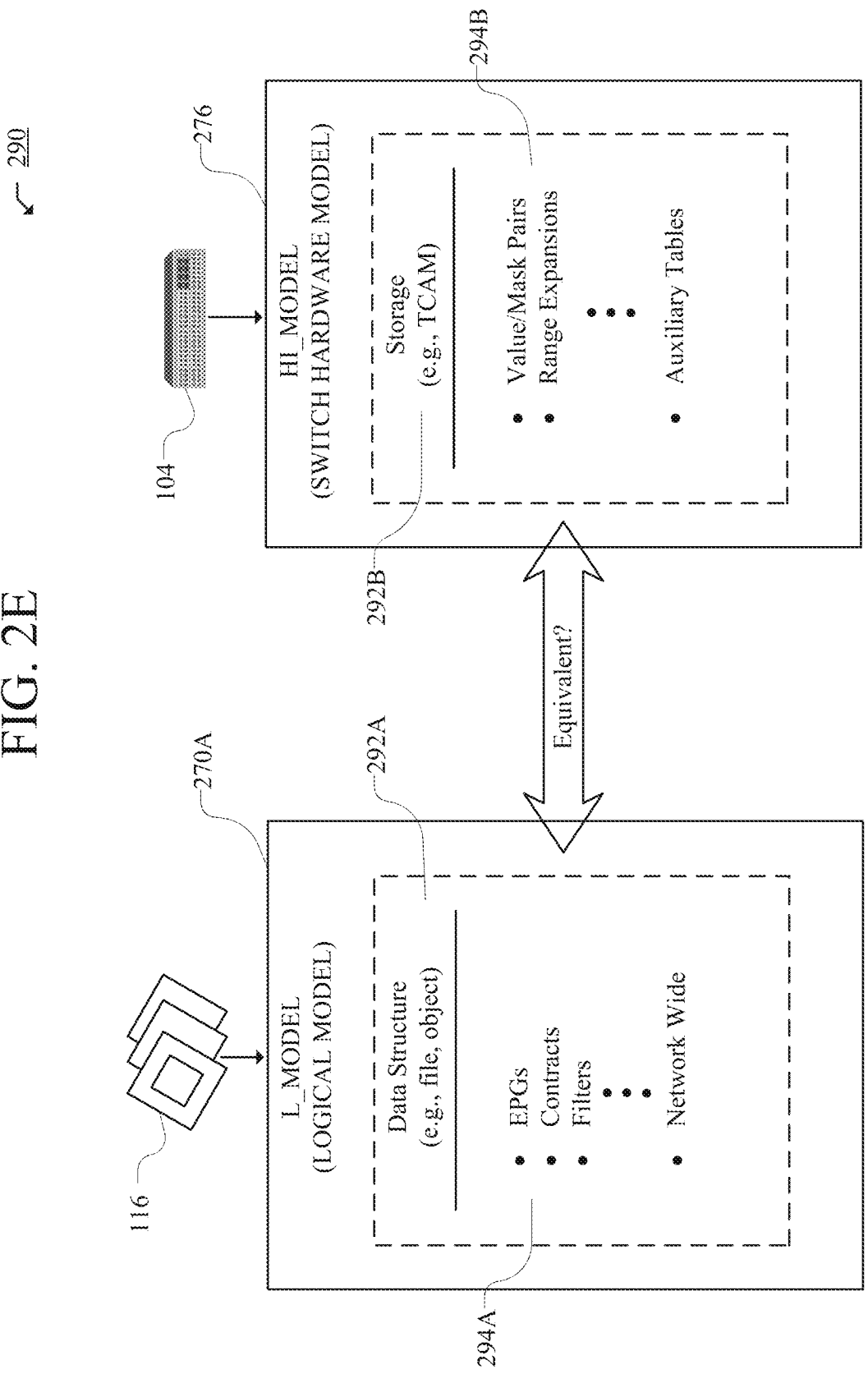

INPUT AND OUTPUT OF STATIC POLICY ANALYZER

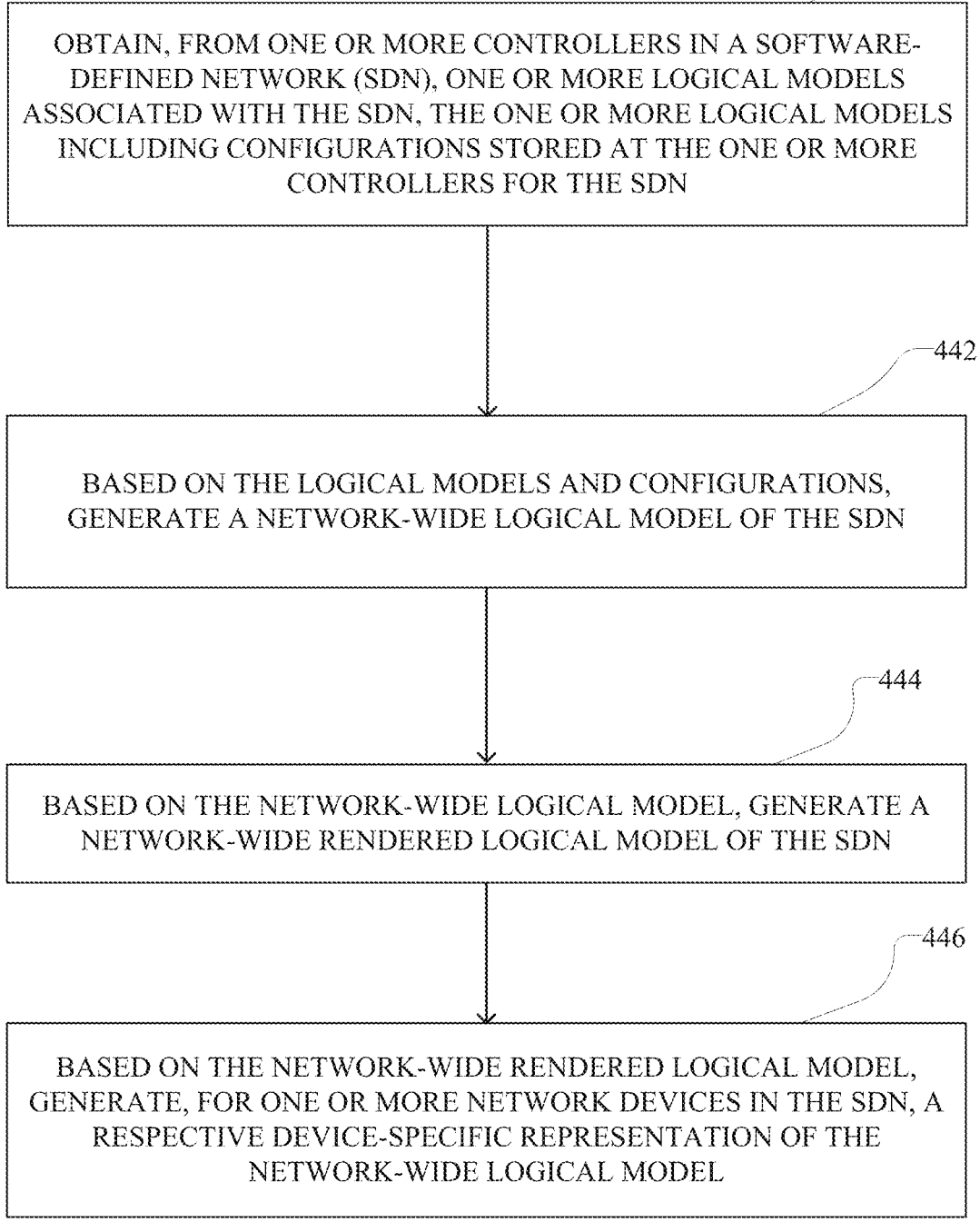

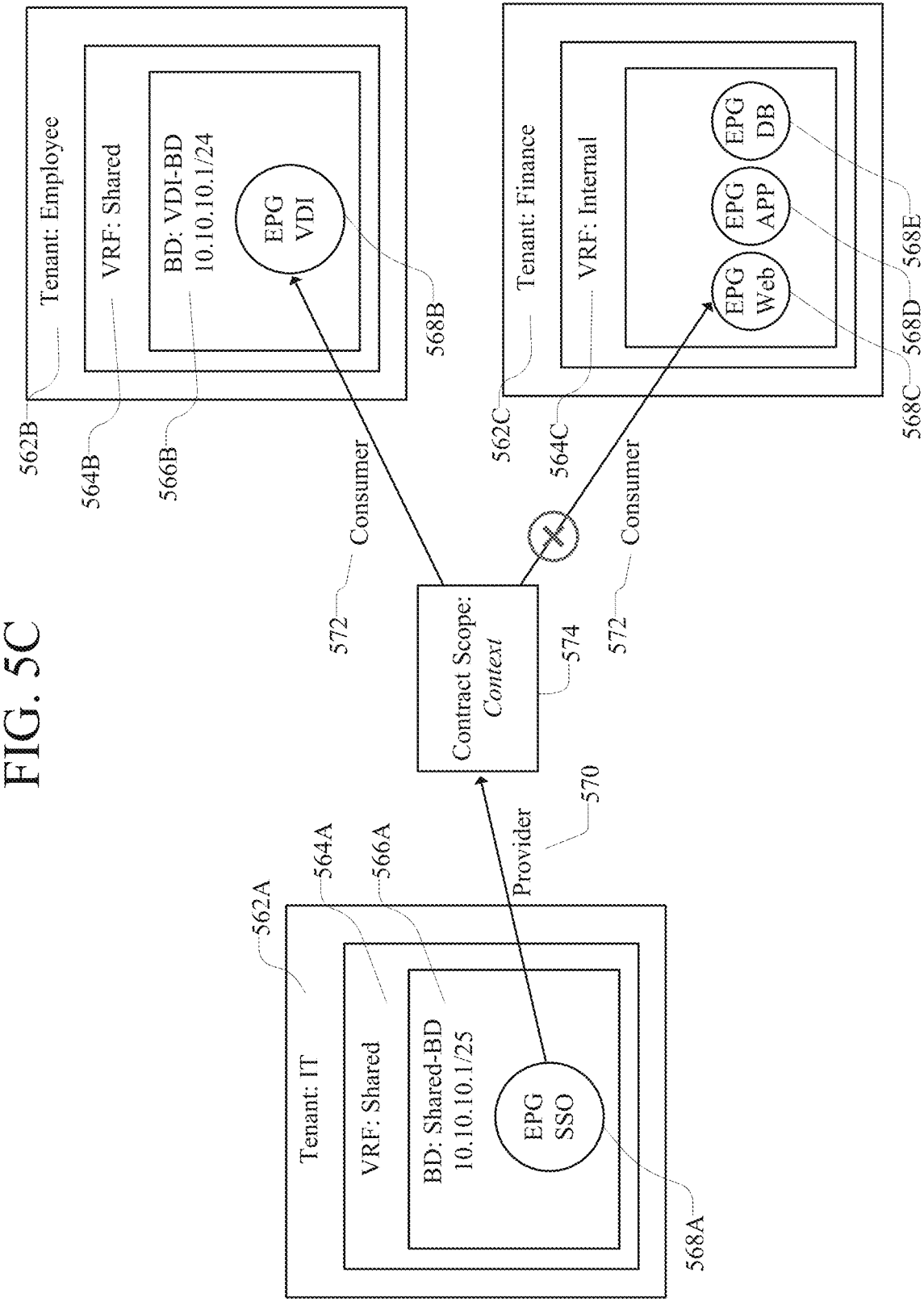

COLLECTING NETWORK MODELS AND NODE INFORMATION FROM A NETWORK

CROSS-REFERENCE TO RELATED APPLICATIONS

This application claims the benefit of, and priority to, U.S. Provisional Patent Application No. 62/520,670, filed on Jun. 16, 2017, entitled "NETWORK MODEL AND NODE INFORMATION COLLECTION FROM A NETWORK", the contents of which are hereby expressly incorporated by reference in its entirety.

TECHNICAL FIELD

The present technology pertains to network configuration and troubleshooting, and more specifically to network modeling and node information collection in a network fabric.

BACKGROUND

Computer networks are becoming increasingly complex, often involving low level as well as high level configurations at various layers of the network. For example, computer networks generally include numerous access policies, forwarding policies, routing policies, security policies, quality-of-service (QoS) policies, etc., which together define the overall behavior and operation of the network. Network operators have a wide array of configuration options for tailoring the network to the needs of the users. While the different configuration options available provide network operators a great degree of flexibility and control over the network, they also add to the complexity of the network. In many cases, the configuration process can become highly complex. Not surprisingly, the network configuration process is increasingly error prone. In addition, troubleshooting errors in a highly complex network can be extremely difficult. The process of identifying the root cause of undesired behavior in the network can be a daunting task.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2E illustrates an equivalency diagram for different models;

FIG. 4C illustrates an example method for obtaining a network-wide logical model of the network and generating a node-specific logical model based on the network-wide logical model;

FIGS. 5A through 5C illustrate example configurations of contracts and objects in a network;

DETAILED DESCRIPTION

Figure 1A:
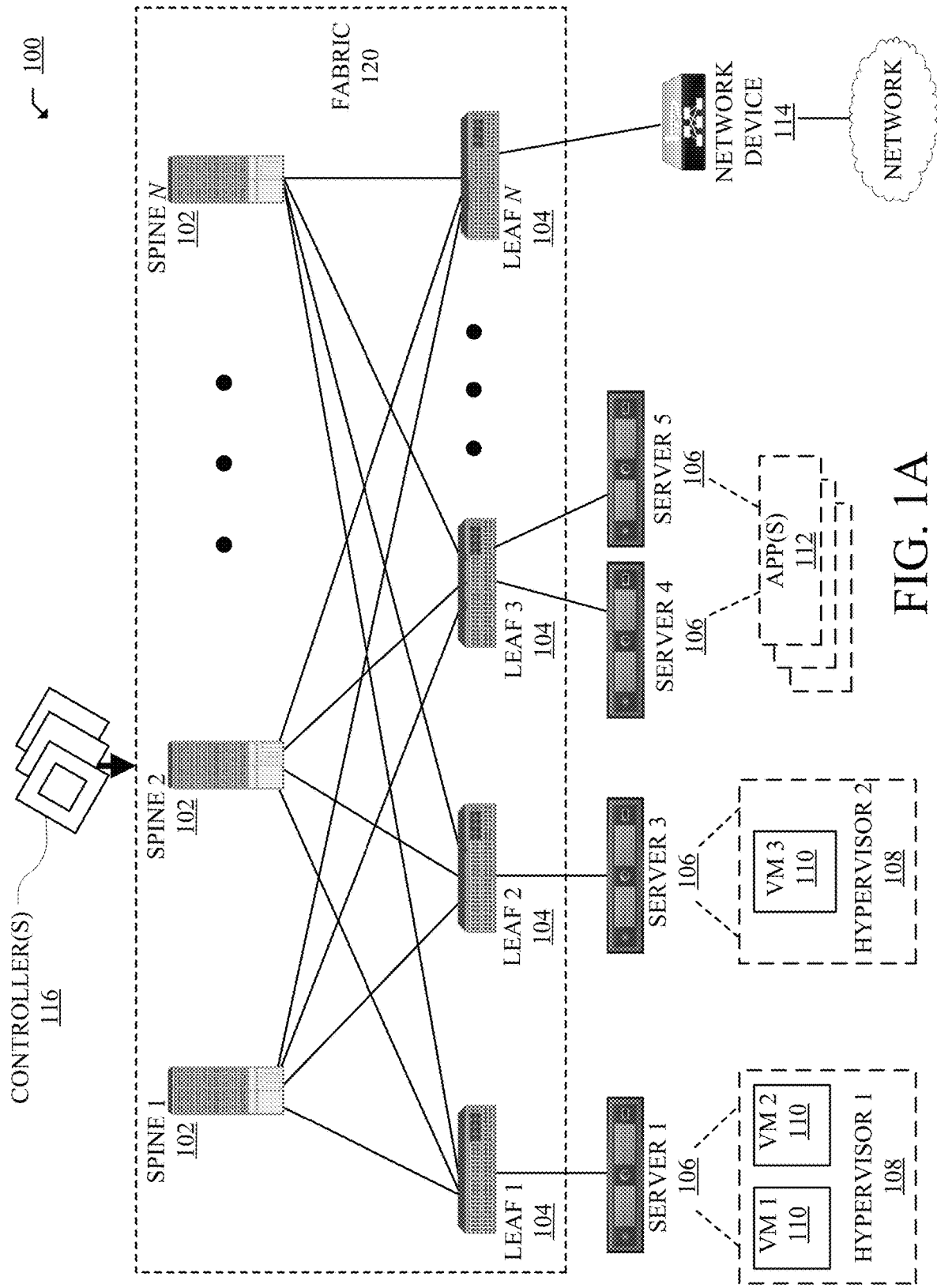
FIGS. 1A and 1B illustrate example network environments.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Software-defined networks (SDNs), such as application-centric infrastructure (ACI) networks, can be managed and configured from one or more centralized network elements, such as application policy infrastructure controllers (APICs) in an ACI network or network managers in other SDN networks. A network operator can define various configurations, objects, rules, etc., for the SDN network, which can be implemented by the one or more centralized network elements. The configuration information provided by the network operator can reflect the network operator's intent for the SDN network, meaning, how the network operator intends for the SDN network and its components to operate. Such user intents can be programmatically encapsulated in logical models stored at the centralized network elements. The logical models can represent the user intents and reflect the configuration of the SDN network. For example, the logical models can represent the object and policy universe (e.g., endpoints, tenants, endpoint groups, networks or contexts, application profiles, services, domains, policies, etc.) as defined for the particular SDN network by the user intents and/or centralized network elements.

In many cases, various nodes and/or controllers in a network may contain respective information or representations of the network and network state. For example, different controllers may store different logical models of the network and each node in the fabric of the network may contain its own configuration model for the network. The approaches set forth herein can collect the information at the various controllers and nodes in the network to generate network-wide models as well as device-specific models corresponding to the network-wide models. These modeling approaches can provide significant insight, foresight, and visibility into the network.

Disclosed herein are systems, methods, and computer-readable media for collecting node information from a network fabric and generating network models based on the collected node information. In some examples, a system can obtain, from one or more controllers in a software-defined network (SDN), a logical model of the SDN, the logical model containing a plurality of objects configured for the SDN from a hierarchical management information tree (MIT) associated with the SDN and representing configurations of the plurality of objects, the hierarchical MIT defining manageable objects and object properties for the SDN, the plurality of objects being associated with, or corresponding to, the manageable objects. The system can obtain a topological model of a fabric associated with the SDN and, based on the topological model, poll nodes in the fabric for respective configurations at the nodes. Based on the respective configurations, the system can generate a node-specific representation of the logical model, the node-specific representation of the logical model projecting the logical model on each respective node.

Example Embodiments

Figure 1B:
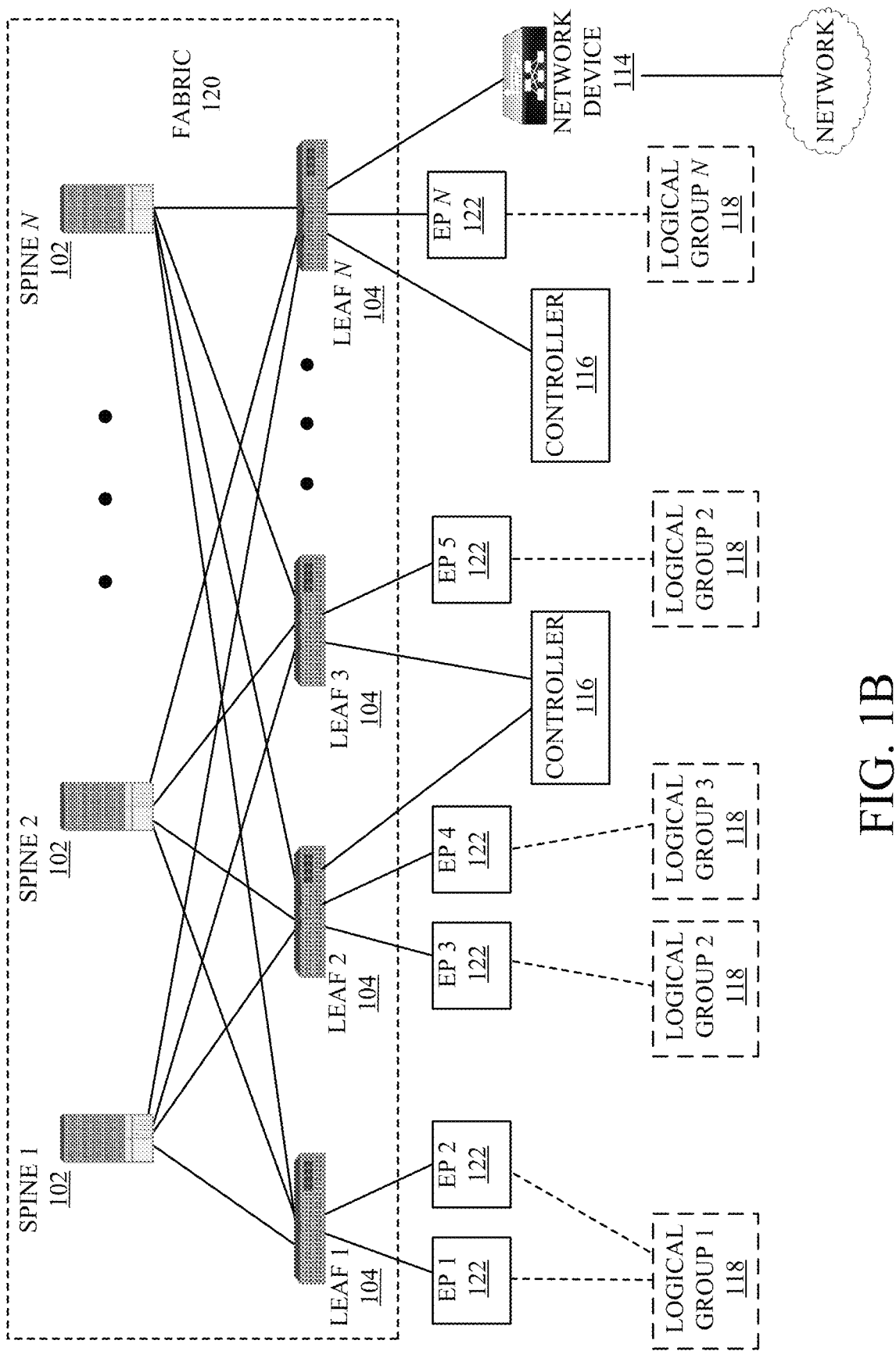
Figure 7:
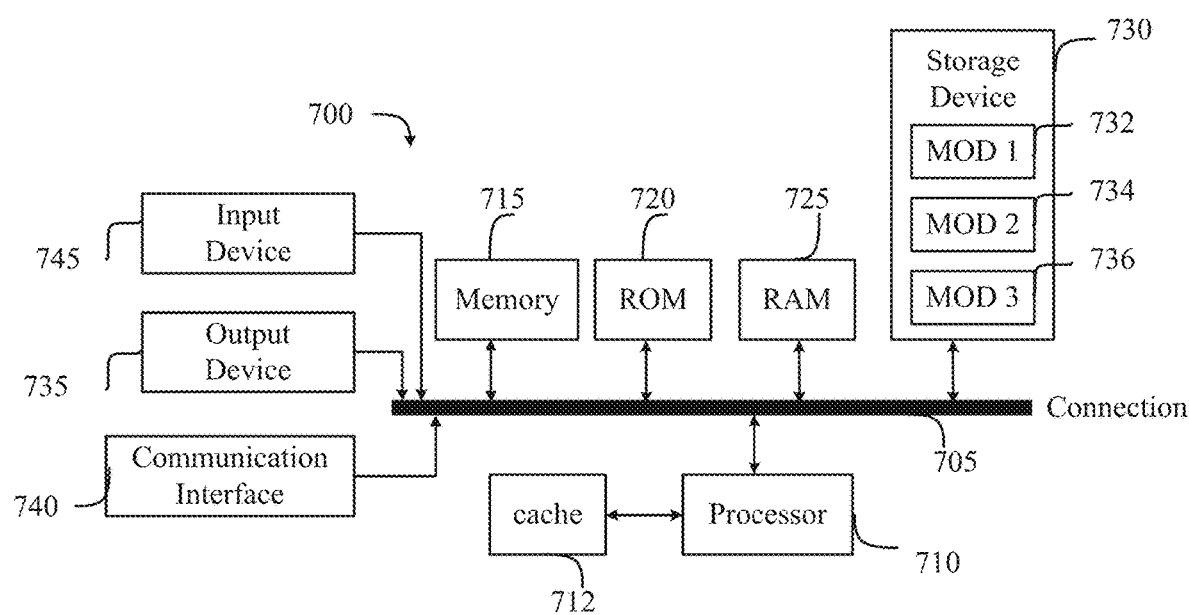
FIG. 7 illustrates an example computing device in accordance with various embodiments.
Figure 8:
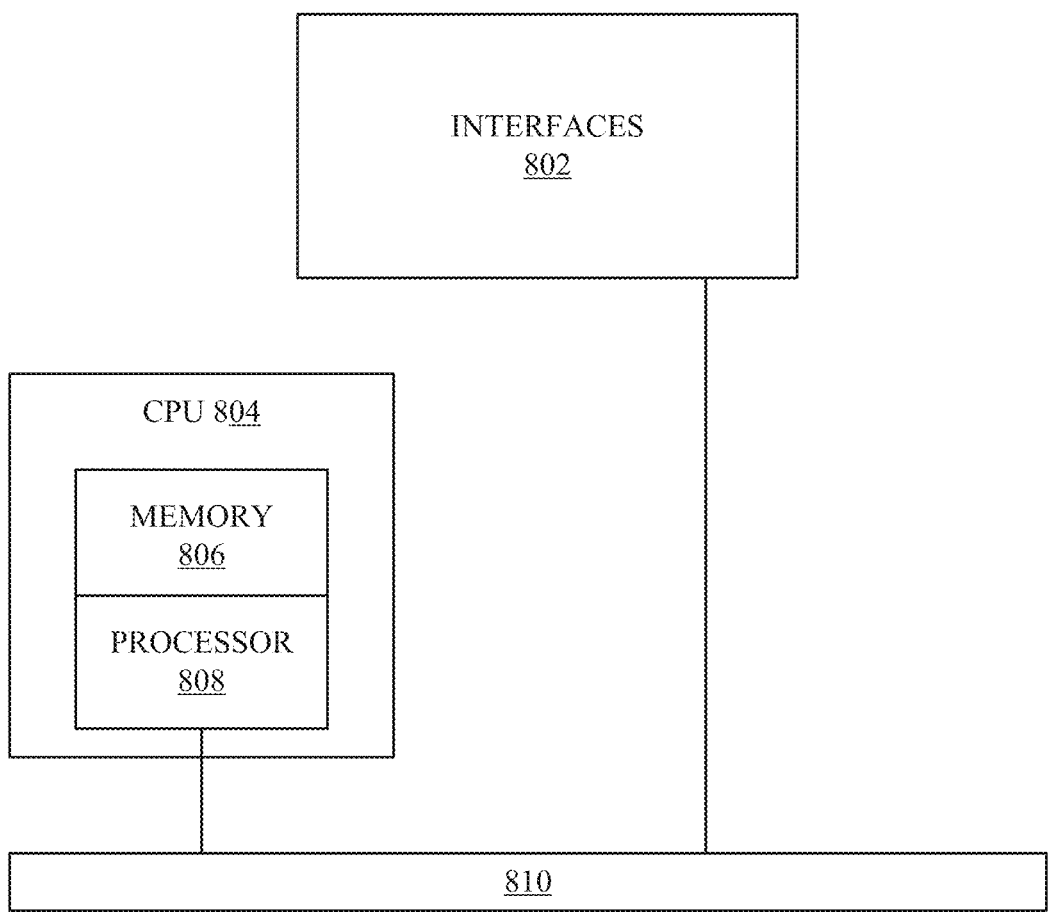
FIG. 8 illustrates an example network device in accordance with various embodiments.

The disclosed technology addresses the need in the art for accurate and efficient network modeling and analysis. The present technology involves system, methods, and computer-readable media for obtaining network models and collecting node information from a network fabric. The present technology will be described in the following disclosure as follows. The discussion begins with an introductory discussion of network assurance and a description of example computing environments, as illustrated in FIGS. 1A and 1B. A discussion of network models for network assurance, as shown in FIGS. 2A through 2E, and network modeling and assurance systems and methods, as shown in FIGS. 3A through 3C and FIGS. 4A through 4C, will then follow. The discussion continues with a description of various configurations in a network model, including contracts, endpoint groups, tenants, bridge domains, contexts, and application profiles, as shown in FIGS. 5A through 5C and FIG. 6. The discussion concludes with a description of example computing and network devices, as illustrated in FIGS. 7 and 8, including example hardware components suitable for hosting software applications and performing computing operations.

The disclosure now turns to an introductory discussion of network assurance.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, settings, configurations, etc., defined for the network and individual network elements (e.g., switches, routers, applications, resources, etc.). However, often times, the configurations, policies, etc., defined by a network operator are incorrect or not accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator implements configuration C but one or more other configurations result in the network behaving in a manner that is inconsistent with the intent reflected by the implementation of configuration C. For example, such a situation can result when configuration C conflicts with other configurations in the network.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a VXLAN or software-defined network (SDN) (e.g., Application Centric Infrastructure (ACI) or VMware NSX networks); etc.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The modeling can consume numerous types of smart events which model a large amount of behavioral aspects of the network. Smart events can impact various aspects of the network, such as underlay services, overlay services, tenant connectivity, tenant security, tenant end point (EP) mobility, tenant policy, tenant routing, resources, etc.

Having described various aspects of network assurance, the disclosure now turns to a discussion of example network environments for network assurance.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc.

Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 2A:
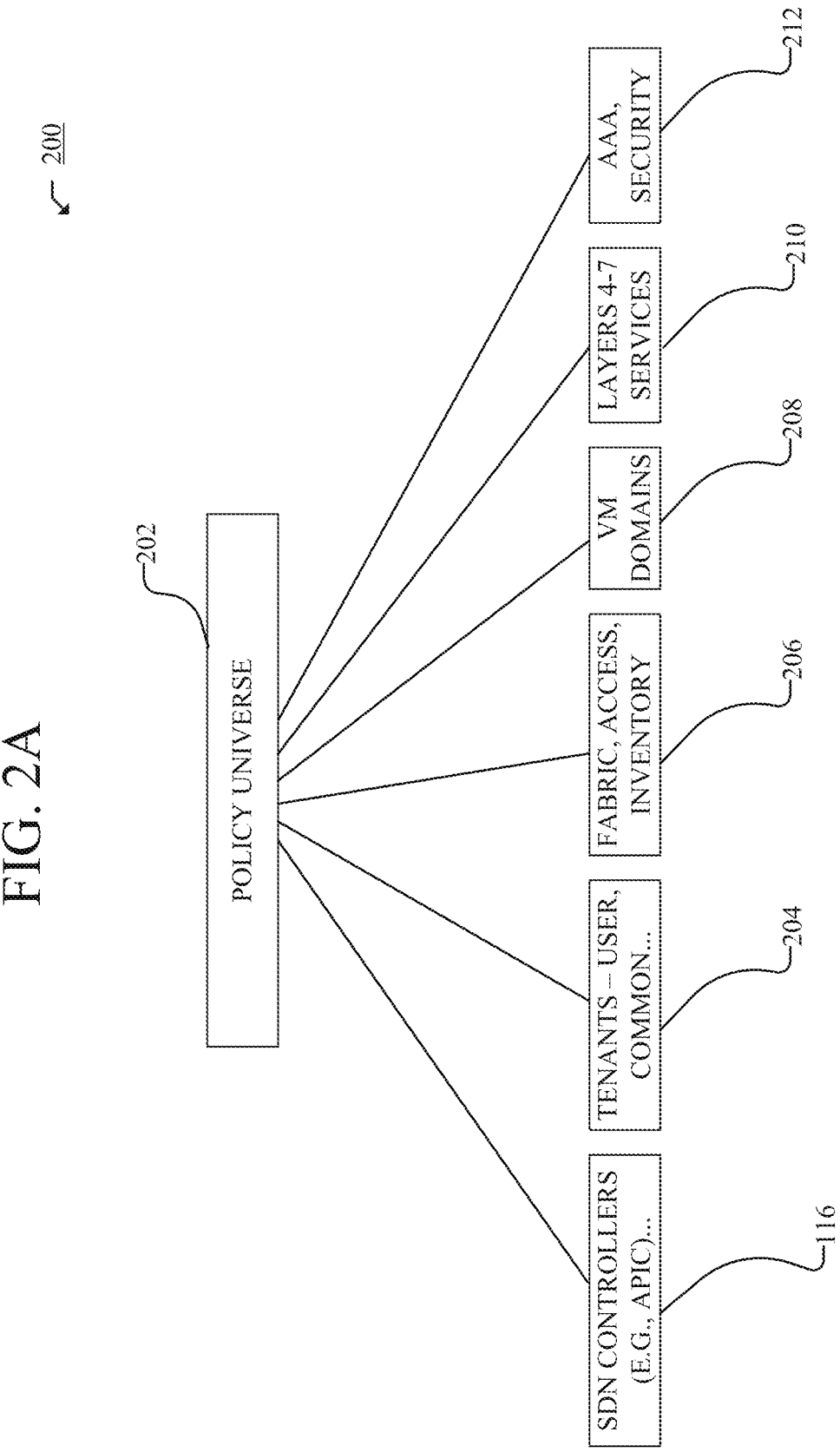
FIG. 2A illustrates an example object model for a network.

FIG. 2A illustrates a diagram of an example Management Information Model 200 for an SDN network, such as Network Environment 100. The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Thus, even if the name of an object, once created, cannot be changed, the Alias can be a field that can be changed.

As used herein, the term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 overlaps Contract 1. In this example, by aliasing Contract 2, Contract 1 may render Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree. A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endoints as previously described with reference to FIG. 1B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
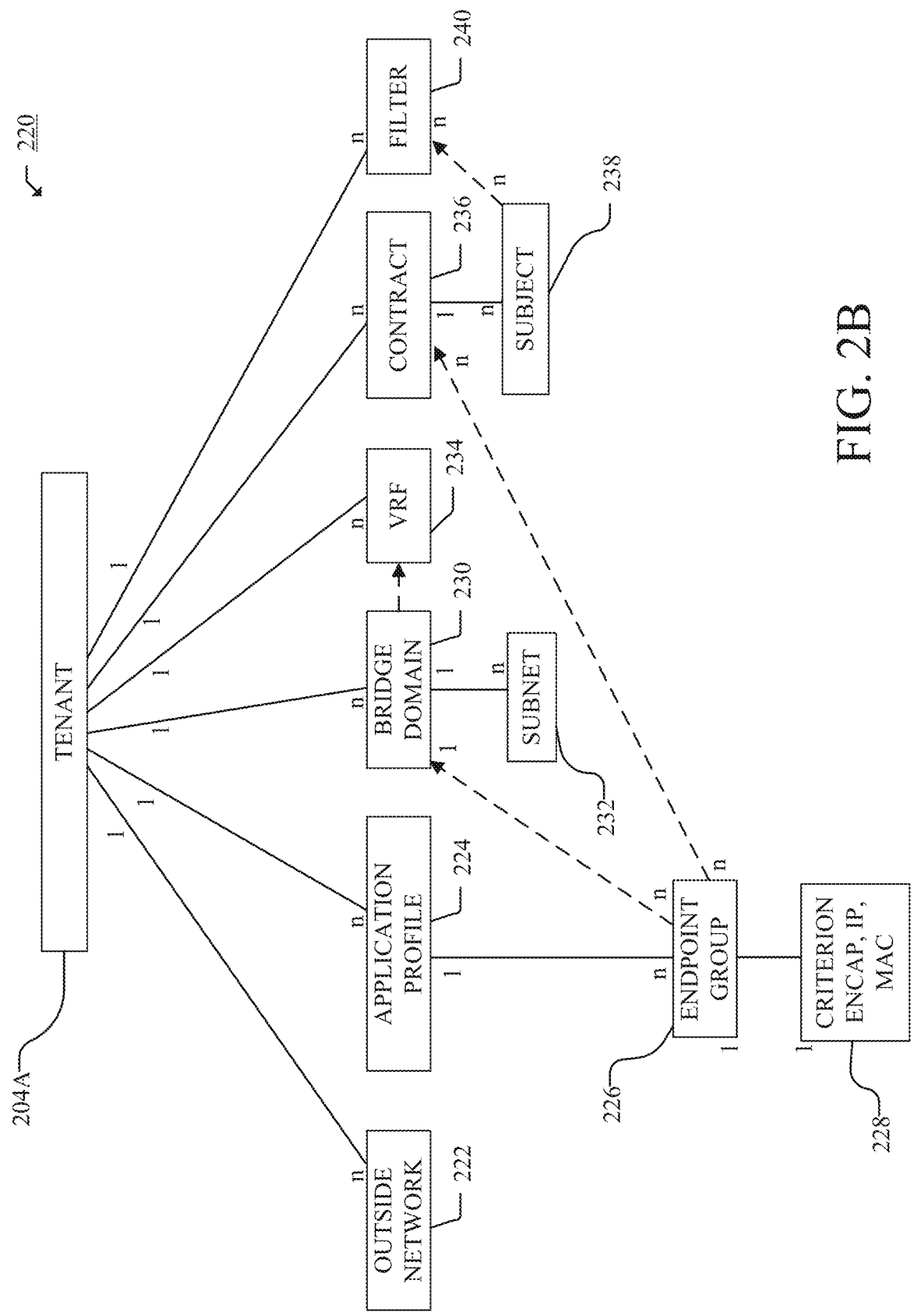
FIG. 2B illustrates an example object model for a tenant object in the example object model from FIG. 2A.

FIG. 2B illustrates an example object model 220 for a tenant portion of MIM 200. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
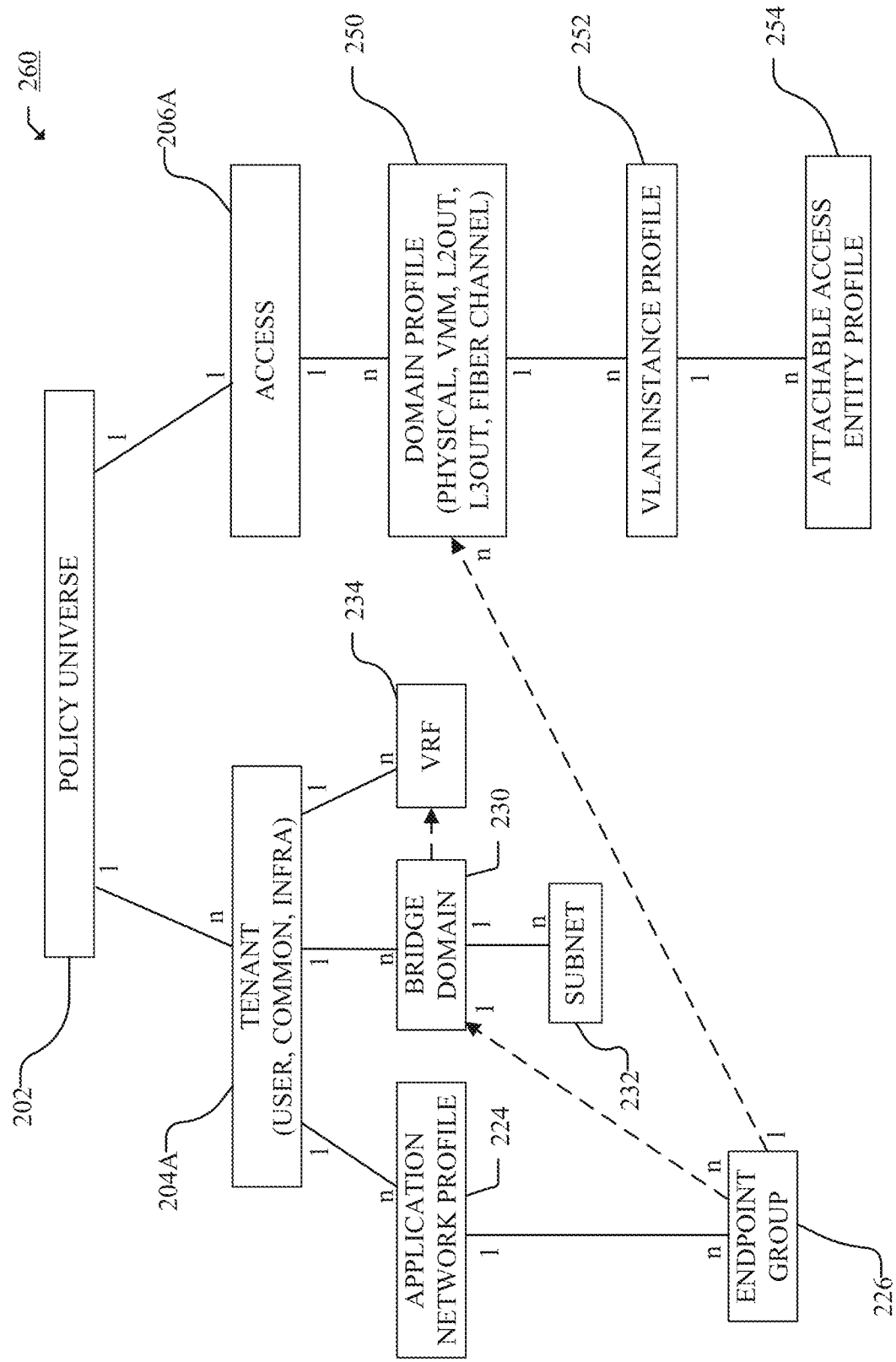
FIG. 2C illustrates an example association of various objects in the example object model from FIG. 2A.

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attacheable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
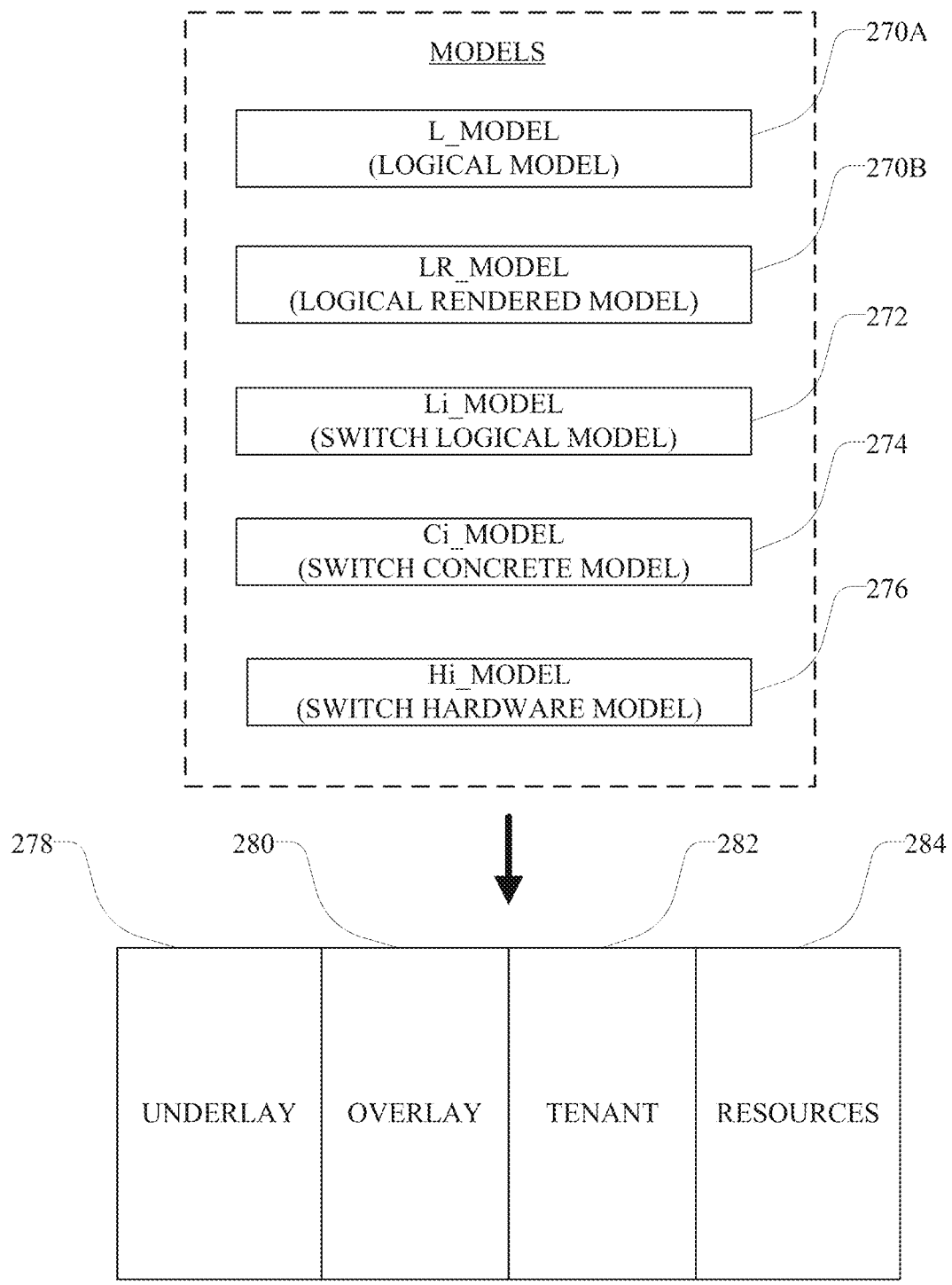
FIG. 2D illustrates a schematic diagram of example models for implementing the example object model from FIG. 2A.

FIG. 2D illustrates a schematic diagram of example models for a network, such as Network Environment 100. The models can be generated based on specific configurations and/or network state parameters associated with various objects, policies, properties, and elements defined in MIM 200. The models can be implemented for network analysis and assurance, and may provide a depiction of the network at various stages of implementation and levels of the network.

As illustrated, the models can include L_Model 270A (Logical Model), LR_Model 270B (Logical Rendered Model or Logical Runtime Model), Li_Model 272 (Logical Model for i), Ci_Model 274 (Concrete model for i), and/or Hi_Model 276 (Hardware model or TCAM Model for i).

L_Model 270A is the logical representation of various elements in MIM 200 as configured in a network (e.g., Network Environment 100), such as objects, object properties, object relationships, and other elements in MIM 200 as configured in a network. L_Model 270A can be generated by Controllers 116 based on configurations entered in Controllers 116 for the network, and thus represents the logical configuration of the network at Controllers 116. This is the declaration of the "end-state" expression that is desired when the elements of the network entities (e.g., applications, tenants, etc.) are connected and Fabric 120 is provisioned by Controllers 116. Because L_Model 270A represents the configurations entered in Controllers 116, including the objects and relationships in MIM 200, it can also reflect the "intent" of the administrator: how the administrator wants the network and network elements to behave.

L_Model 270A can be a fabric or network-wide logical model. For example, L_Model 270A can account configurations and objects from each of Controllers 116. As previously explained, Network Environment 100 can include multiple Controllers 116. In some cases, two or more Controllers 116 may include different configurations or logical models for the network. In such cases, L_Model 270A can obtain any of the configurations or logical models from Controllers 116 and generate a fabric or network wide logical model based on the configurations and logical models from all Controllers 116. L_Model 270A can thus incorporate configurations or logical models between Controllers 116 to provide a comprehensive logical model. L_Model 270A can also address or account for any dependencies, redundancies, conflicts, etc., that may result from the configurations or logical models at the different Controllers 116.

LR_Model 270B is the abstract model expression that Controllers 116 (e.g., APICs in ACI) resolve from L_Model 270A. LR_Model 270B can provide the configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122. LR_Model 270B can also incorporate state information to capture a runtime state of the network (e.g., Fabric 120).

In some cases, LR_Model 270B can provide a representation of L_Model 270A that is normalized according to a specific format or expression that can be propagated to, and/or understood by, the physical infrastructure of Fabric 120 (e.g., Leafs 104, Spines 102, etc.). For example, LR_Model 270B can associate the elements in L_Model 270A with specific identifiers or tags that can be interpreted and/or compiled by the switches in Fabric 120, such as hardware plane identifiers used as classifiers.

Li_Model 272 is a switch-level or switch-specific model obtained from L_Model 270A and/or LR_Model 270B. Li_Model 272 can project L_Model 270A and/or LR_Model 270B on a specific switch or device i, and thus can convey how L_Model 270A and/or LR_Model 270B should appear or be implemented at the specific switch or device i.

For example, Li_Model 272 can project L_Model 270A and/or LR_Model 270B pertaining to a specific switch i to capture a switch-level representation of L_Model 270A and/or LR_Model 270B at switch i. To illustrate, Li_Model 272 $L_1$ can represent L_Model 270A and/or LR_Model 270B projected to, or implemented at, Leaf 1 (104). Thus, Li_Model 272 can be generated from L_Model 270A and/or LR_Model 270B for individual devices (e.g., Leafs 104, Spines 102, etc.) on Fabric 120.

In some cases, Li_Model 272 can be represented using JSON (JavaScript Object Notation). For example, Li_Model 272 can include JSON objects, such as Rules, Filters, Entries, and Scopes.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

In some cases, Li_Model 272 and Ci_Model 274 can have a same or similar format. For example, Li_Model 272 and Ci_Model 274 can be based on JSON objects. Having the same or similar format can facilitate objects in Li_Model 272 and Ci_Model 274 to be compared for equivalence or congruence. Such equivalence or congruence checks can be used for network analysis and assurance, as further described herein.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci_Model 274 in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci_Model 274, and/or Hi_Model 276 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi_Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278 representing one or more aspects of Fabric 120 (e.g., underlay topology, routing, etc.), Overlay Model 280 representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 282 representing one or more aspects of Tenant portion 204A in MIM 200 (e.g., security, forwarding, service chaining, QoS, VRFs, BDs, Contracts, Filters, EPGs, subnets, etc.), Resources Model 284 representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

FIG. 2E illustrates an equivalency diagram 290 of different models. In this example, the L_Model 270A obtained from Controller(s) 116 in Network Environment 100 can be compared with the Hi_Model 276 obtained from one or more Leafs 104 in the Fabric 120. This comparison can provide an equivalency check in order to determine whether the logical configuration of the Network Environment 100 at the Controller(s) 116 is consistent with, or conflicts with, the rules rendered on the one or more Leafs 104 (e.g., rules and/or configurations in storage, such as TCAM).

For example, a network operator can define objects and configurations for Network Environment 100 from Controller(s) 116. Controller(s) 116 can then store the definitions and configurations from the network operator and construct a logical model (e.g., L_Model 270A) of the Network Environment 100. The Controller(s) 116 can push the definitions and configurations provided by the network operator and reflected in the logical model to each of the nodes (e.g., Leafs 104) in the Fabric 120. The nodes in the Fabric 120 can receive such information and rendered or compile rules on the node's software (e.g., Operating System). The rules rendered or compiled on the node's software can be constructed into a Construct Model (e.g., Ci_Model 274). The rules from the Construct Model can then be pushed from the node's software to the node's hardware (e.g., TCAM) and stored or rendered as rules on the node's hardware. The rules stored or rendered on the node's hardware can be constructed into a Hardware Model (e.g., Hi_Model 276) for the node.

The various models (e.g., L_Model 270A and Hi_Model 276) can thus represent the rules and configurations at each stage (e.g., intent specification at Controller(s) 116, rendering or compiling on the node's software, rendering or storing on the node's hardware, etc.) as the definitions and configurations entered by the network operator are pushed through each stage. Accordingly, an equivalency check of various models, such as L_Model 270A and Hi_Model 276, can be used to determine whether the definitions and configurations have been properly pushed, rendered, and/or stored at each respective stage associated with the various models. If the models pass the equivalency check, then the definitions and configurations at each stage (e.g., Controller(s) 116, software on the node, hardware on the node, etc.) can be verified as accurate and consistent. By contrast, if there is an error in the equivalency check, then a misconfiguration can be detected at one or more specific stages. The equivalency check between various models can also be used to determine where (e.g., at which stage) the problem or misconfiguration has occurred. For example, the stage where the problem or misconfiguration occurred can be ascertained based on which model(s) fail the equivalency check.

The L_Model 270A and Hi_Model 276 can store or render the rules, configurations, properties, definitions, etc., in a respective structure 292A, 292B. For example, the L_Model 270A can store or render rules, configurations, objects, properties, etc., in a data structure 292A, such as a file or object (e.g., JSON, XML, etc.), and Hi_Model 276 can store or render rules, configurations, etc., in a storage 292B, such as TCAM memory. The structure 292A, 292B associated with the L_Model 270A and Hi_Model 276 can influence the format, organization, type, etc., of the data (e.g., rules, configurations, properties, definitions, etc.) stored or rendered.

For example, L_Model 270A can store the data as objects and object properties 294A, such as EPGs, contracts, filters, tenants, contexts, BDs, network wide parameters, etc. The Hi_Model 276 can store the data as values and tables 294B, such as value/mask pairs, range expressions, auxiliary tables, etc.

As a result, the data in the L_Model 270A and Hi_Model 276 can be normalized, canonized, diagramed, modeled, re-formatted, flattened, etc., to perform an equivalency between the L_Model 270A and Hi_Model 276. For example, the data can be converted using bit vectors, Boolean functions, ROBDDs, etc., to perform a mathematical check of equivalency between the L_Model 270A and Hi_Model 276.

Figure 3A:
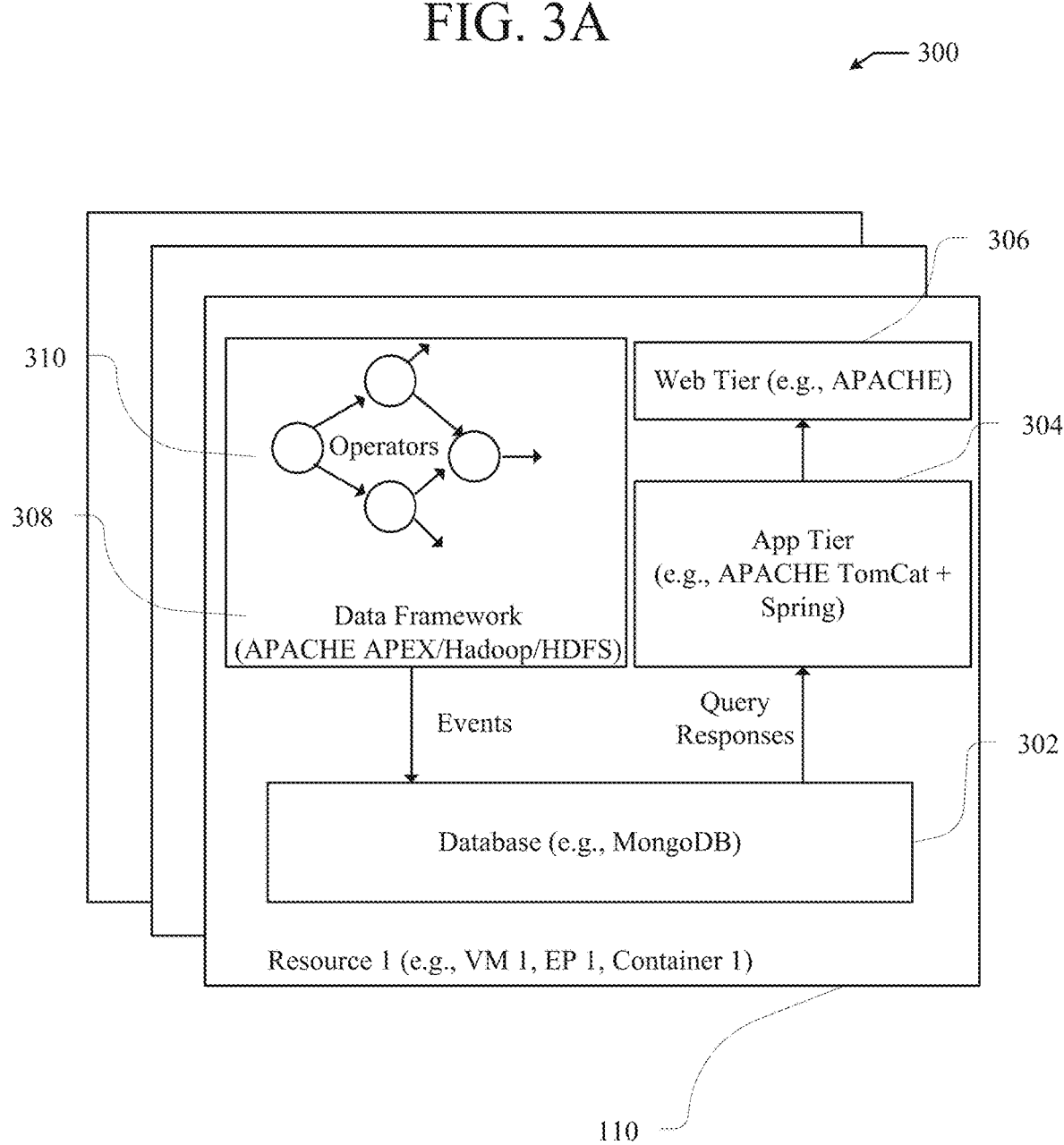
FIG. 3A illustrates an example network assurance appliance.

FIG. 3A illustrates a diagram of an example Assurance Appliance 300 for network assurance. In this example, Assurance Appliance 300 can include k VMs 110 operating in cluster mode. VMs are used in this example for explanation purposes. However, it should be understood that other configurations are also contemplated herein, such as use of containers, bare metal devices, Endpoints 122, or any other physical or logical systems. Moreover, while FIG. 3A illustrates a cluster mode configuration, other configurations are also contemplated herein, such as a single mode configuration (e.g., single VM, container, or server) or a service chain for example.

Assurance Appliance 300 can run on one or more Servers 106, VMs 110, Hypervisors 108, EPs 122, Leafs 104, Controllers 116, or any other system or resource. For example, Assurance Appliance 300 can be a logical service or application running on one or more VMs 110 in Network Environment 100.

The Assurance Appliance 300 can include Data Framework 308, which can be based on, for example, APACHE APEX and HADOOP. In some cases, assurance checks can be written as individual operators that reside in Data Framework 308. This enables a natively horizontal scale-out architecture that can scale to arbitrary number of switches in Fabric 120 (e.g., ACI fabric).

Assurance Appliance 300 can poll Fabric 120 at a configurable periodicity (e.g., an epoch). The analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE Tomcat and Spring framework) 304 and Web Server 306. A graphical user interface (GUI) interacts via the APIs exposed to the customer. These APIs can also be used by the customer to collect data from Assurance Appliance 300 for further integration into other tools.

Operators 310 in Data Framework 308 (e.g., APEX/Hadoop) can together support assurance operations. Below are non-limiting examples of assurance operations that can be performed by Assurance Appliance 300 via Operators 310.

Security Policy Adherence

Assurance Appliance 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance 300 can check for issues in the specification of the user's intent or intents (e.g., identify contradictory or conflicting policies in L_Model 270A). Assurance Appliance 300 can identify lint events based on the intent specification of a network. The lint and policy analysis can include semantic and/or syntactic checks of the intent specification(s) of a network.

TCAM Utilization

TCAM is a scarce resource in the fabric (e.g., Fabric 120). However, Assurance Appliance 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance 300 can validate that BDs, VRFs, subnets (both internal and external), VLANs, contracts, filters, applications, EPGs, etc., are correctly programmed.

Infrastructure Routing

Assurance Appliance 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-time Change Analysis

Assurance Appliance 300 can validate rules in the specification of the network (e.g., L_Model 270A) are complete and do not have inconsistencies or other problems. MOs in the MIM 200 can be checked by Assurance Appliance 300 through syntactic and semantic checks performed on L_Model 270A and/or the associated configurations of the MOs in MIM 200. Assurance Appliance 300 can also verify that unnecessary, stale, unused or redundant configurations, such as contracts, are removed.

Figure 3B:
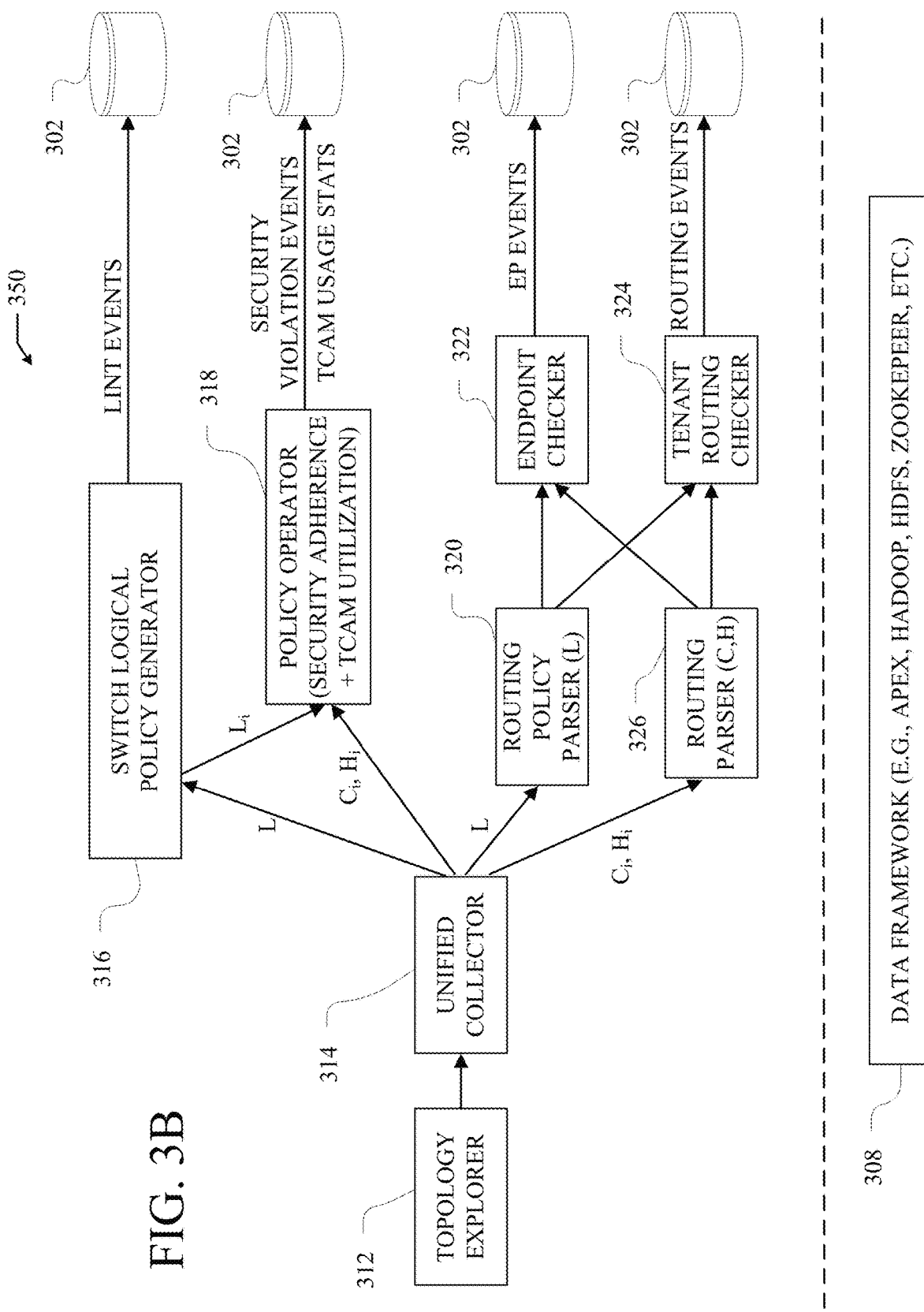
FIG. 3B illustrates an example system for network assurance.

FIG. 3B illustrates an architectural diagram of an example system 350 for network assurance, such as Assurance Appliance 300. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

In some examples, Topology Explorer 312 can receive as input a list of Controllers 116 (e.g., APIC controllers) that are associated with the network/fabric (e.g., Fabric 120). Topology Explorer 312 can also receive corresponding credentials to login to each controller. Topology Explorer 312 can retrieve information from each controller using, for example, REST calls. Topology Explorer 312 can obtain from each controller a list of nodes (e.g., Leafs 104 and Spines 102), and their associated properties, that the controller is aware of. Topology Explorer 312 can obtain node information from Controllers 116 including, without limitation, an IP address, a node identifier, a node name, a node domain, a node URI, a node_dm, a node role, a node version, etc.

Topology Explorer 312 can also determine if Controllers 116 are in quorum, or are sufficiently communicatively coupled amongst themselves. For example, if there are n controllers, a quorum condition might be met when (n/2+1) controllers are aware of each other and/or are communicatively coupled. Topology Explorer 312 can make the determination of a quorum (or identify any failed nodes or controllers) by parsing the data returned from the controllers, and identifying communicative couplings between their constituent nodes. Topology Explorer 312 can identify the type of each node in the network, e.g. spine, leaf, APIC, etc., and include this information in the topology information generated (e.g., topology map or model).

If no quorum is present, Topology Explorer 312 can trigger an event and alert a user that reconfiguration or suitable attention is required. If a quorum is present, Topology Explorer 312 can compile the network topology information into a JSON object and pass it downstream to other operators or services, such as Unified Collector 314.

Unified Collector 314 can receive the topological view or model from Topology Explorer 312 and use the topology information to collect information for network assurance from Fabric 120. Unified Collector 314 can poll nodes (e.g., Controllers 116, Leafs 104, Spines 102, etc.) in Fabric 120 to collect information from the nodes.

Unified Collector 314 can include one or more collectors (e.g., collector devices, operators, applications, VMs, etc.) configured to collect information from Topology Explorer 312 and/or nodes in Fabric 120. For example, Unified Collector 314 can include a cluster of collectors, and each of the collectors can be assigned to a subset of nodes within the topological model and/or Fabric 120 in order to collect information from their assigned subset of nodes. For performance, Unified Collector 314 can run in a parallel, multi-threaded fashion.

Unified Collector 314 can perform load balancing across individual collectors in order to streamline the efficiency of the overall collection process. Load balancing can be optimized by managing the distribution of subsets of nodes to collectors, for example by randomly hashing nodes to collectors.

In some cases, Assurance Appliance 300 can run multiple instances of Unified Collector 314. This can also allow Assurance Appliance 300 to distribute the task of collecting data for each node in the topology (e.g., Fabric 120 including Spines 102, Leafs 104, Controllers 116, etc.) via sharding and/or load balancing, and map collection tasks and/or nodes to a particular instance of Unified Collector 314 with data collection across nodes being performed in parallel by various instances of Unified Collector 314. Within a given node, commands and data collection can be executed serially. Assurance Appliance 300 can control the number of threads used by each instance of Unified Collector 314 to poll data from Fabric 120.

Unified Collector 314 can collect models (e.g., L_Model 270A and/or LR_Model 270B) from Controllers 116, switch software configurations and models (e.g., Ci_Model 274) from nodes (e.g., Leafs 104 and/or Spines 102) in Fabric 120, hardware configurations and models (e.g., Hi_Model 276) from nodes (e.g., Leafs 104 and/or Spines 102) in Fabric 120, etc. Unified Collector 314 can collect Ci_Model 274 and Hi_Model 276 from individual nodes or fabric members, such as Leafs 104 and Spines 102, and L_Model 270A and/or LR_Model 270B from one or more controllers (e.g., Controllers 116) in Network Environment 100.

Unified Collector 314 can poll the devices that Topology Explorer 312 discovers in order to collect data from Fabric 120 (e.g., from the constituent members of the fabric). Unified Collector 314 can collect the data using interfaces exposed by Controllers 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including, without limitation: topology information, tenant forwarding/routing information, tenant security policies, contracts, interface policies, physical domain or VMM domain information, OOB (out-of-band) management IP's of nodes in the fabric, etc.

Unified Collector 314 can also poll information from nodes (e.g., Leafs 104 and Spines 102) in Fabric 120, including without limitation: Ci_Models 274 for VLANs, BDs, and security policies; Link Layer Discovery Protocol (LLDP) connectivity information of nodes (e.g., Leafs 104 and/or Spines 102); endpoint information from EPM/COOP; fabric card information from Spines 102; routing information base (RIB) tables from nodes in Fabric 120; forwarding information base (FIB) tables from nodes in Fabric 120; security group hardware tables (e.g., TCAM tables) from nodes in Fabric 120; etc.

In some cases, Unified Collector 314 can obtain runtime state from the network and incorporate runtime state information into L_Model 270A and/or LR_Model 270B. Unified Collector 314 can also obtain multiple logical models from Controllers 116 and generate a comprehensive or network-wide logical model (e.g., L_Model 270A and/or LR_Model 270B) based on the logical models. Unified Collector 314 can compare logical models from Controllers 116, resolve dependencies, remove redundancies, etc., and generate a single L_Model 270A and/or LR_Model 270B for the entire network or fabric.

Unified Collector 314 can collect the entire network state across Controllers 116 and fabric nodes or members (e.g., Leafs 104 and/or Spines 102). For example, Unified Collector 314 can use a REST interface and an SSH interface to collect the network state. This information collected by Unified Collector 314 can include data relating to the link layer, VLANs, BDs, VRFs, security policies, etc. The state information can be represented in LR_Model 270B, as previously mentioned. Unified Collector 314 can then publish the collected information and models to any downstream operators that are interested in or require such information. Unified Collector 314 can publish information as it is received, such that data is streamed to the downstream operators.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance 300 can contact Controllers 116, Spines 102, Leafs 104, and other nodes to collect various types of data. In some scenarios, Assurance Appliance 300 may experience a failure (e.g., connectivity problem, hardware or software error, etc.) that prevents it from being able to collect data for a period of time. Assurance Appliance 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A and/or LR_Model 270B for each switch.

Each Li_Model 272 can represent L_Model 270A and/or LR_Model 270B as projected or applied at the respective network device i (e.g., switch i) in Fabric 120. In some cases, Li_Model 272 can be normalized or formatted in a manner that is compatible with the respective network device. For example, Li_Model 272 can be formatted in a manner that can be read or executed by the respective network device. To illustrate, Li_Model 272 can included specific identifiers (e.g., hardware plane identifiers used by Controllers 116 as classifiers, etc.) or tags (e.g., policy group tags) that can be interpreted by the respective network device. In some cases, Li_Model 272 can include JSON objects. For example, Li_Model 272 can include JSON objects to represent rules, filters, entries, scopes, etc.

The format used for Li_Model 272 can be the same as, or consistent with, the format of Ci_Model 274. For example, both Li_Model 272 and Ci_Model 274 may be based on JSON objects. Similar or matching formats can enable Li_Model 272 and Ci_Model 274 to be compared for equivalence or congruence. Such equivalency checks can aid in network analysis and assurance as further explained herein.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffs (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 3C:
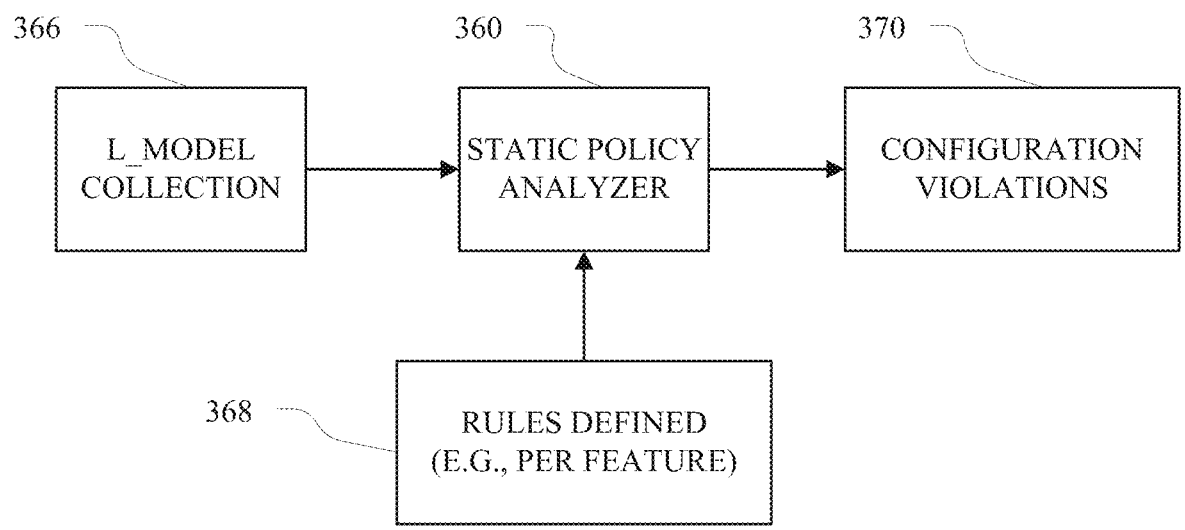
FIG. 3C illustrates a schematic diagram of an example static policy analyzer.

FIG. 3C illustrates a schematic diagram of an example system for static policy analysis in a network (e.g., Network Environment 100). Static Policy Analyzer 360 can perform assurance checks to detect configuration violations, logical lint events, contradictory or conflicting policies, unused contracts, incomplete configurations, etc. Static Policy Analyzer 360 can check the specification of the user's intent or intents in L_Model 270A to determine if any configurations in Controllers 116 are inconsistent with the specification of the user's intent or intents.

Static Policy Analyzer 360 can include one or more of the Operators 310 executed or hosted in Assurance Appliance 300. However, in other configurations, Static Policy Analyzer 360 can run one or more operators or engines that are separate from Operators 310 and/or Assurance Appliance 300. For example, Static Policy Analyzer 360 can be a VM, a cluster of VMs, or a collection of endpoints in a service function chain.

Static Policy Analyzer 360 can receive as input L_Model 270A from Logical Model Collection Process 366 and Rules 368 defined for each feature (e.g., object) in L_Model 270A. Rules 368 can be based on objects, relationships, definitions, configurations, and any other features in MIM 200. Rules 368 can specify conditions, relationships, parameters, and/or any other information for identifying configuration violations or issues.

Moreover, Rules 368 can include information for identifying syntactic violations or issues. For example, Rules 368 can include one or more rules for performing syntactic checks. Syntactic checks can verify that the configuration of L_Model 270A is complete, and can help identify configurations or rules that are not being used. Syntactic checks can also verify that the configurations in the hierarchical MIM 200 are complete (have been defined) and identify any configurations that are defined but not used. To illustrate, Rules 368 can specify that every tenant in L_Model 270A should have a context configured configured; every contract in L_Model 270A should specify a provider EPG and a consumer EPG; every contract in L_Model 270A should specify a subject, filter, and/or port; etc.

Rules 368 can also include rules for performing semantic checks and identifying semantic violations or issues. Semantic checks can check conflicting rules or configurations. For example, Rule1 and Rule2 can have aliasing issues, Rule1 can be more specific than Rule2 and thereby create conflicts/issues, etc. Rules 368 can define conditions which may result in aliased rules, conflicting rules, etc. To illustrate, Rules 368 can specify that an allow policy for a specific communication between two objects can conflict with a deny policy for the same communication between two objects if the allow policy has a higher priority than the deny policy, or a rule for an object renders another rule unnecessary.

Static Policy Analyzer 360 can apply Rules 368 to L_Model 270A to check configurations in L_Model 270A and output Configuration Violation Events 370 (e.g., alerts, logs, notifications, etc.) based on any issues detected. Configuration Violation Events 370 can include semantic or semantic problems, such as incomplete configurations, conflicting configurations, aliased rules, unused configurations, errors, policy violations, misconfigured objects, incomplete configurations, incorrect contract scopes, improper object relationships, etc.

In some cases, Static Policy Analyzer 360 can iteratively traverse each node in a tree generated based on L_Model 270A and/or MIM 200, and apply Rules 368 at each node in the tree to determine if any nodes yield a violation (e.g., incomplete configuration, improper configuration, unused configuration, etc.). Static Policy Analyzer 360 can output Configuration Violation Events 370 when it detects any violations.

Figure 4A:
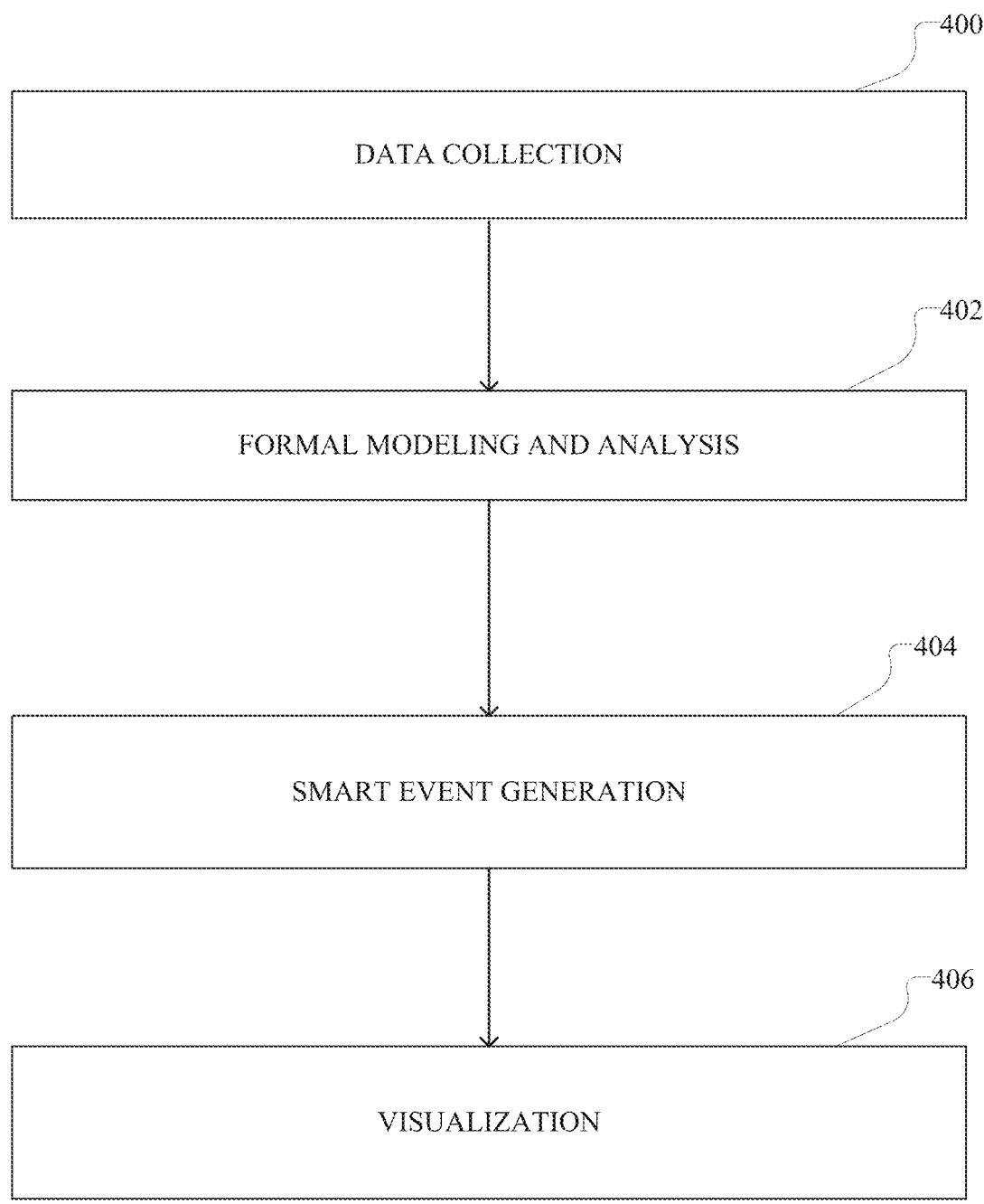
FIG. 4A illustrates an example method for network assurance.
Figure 4B:
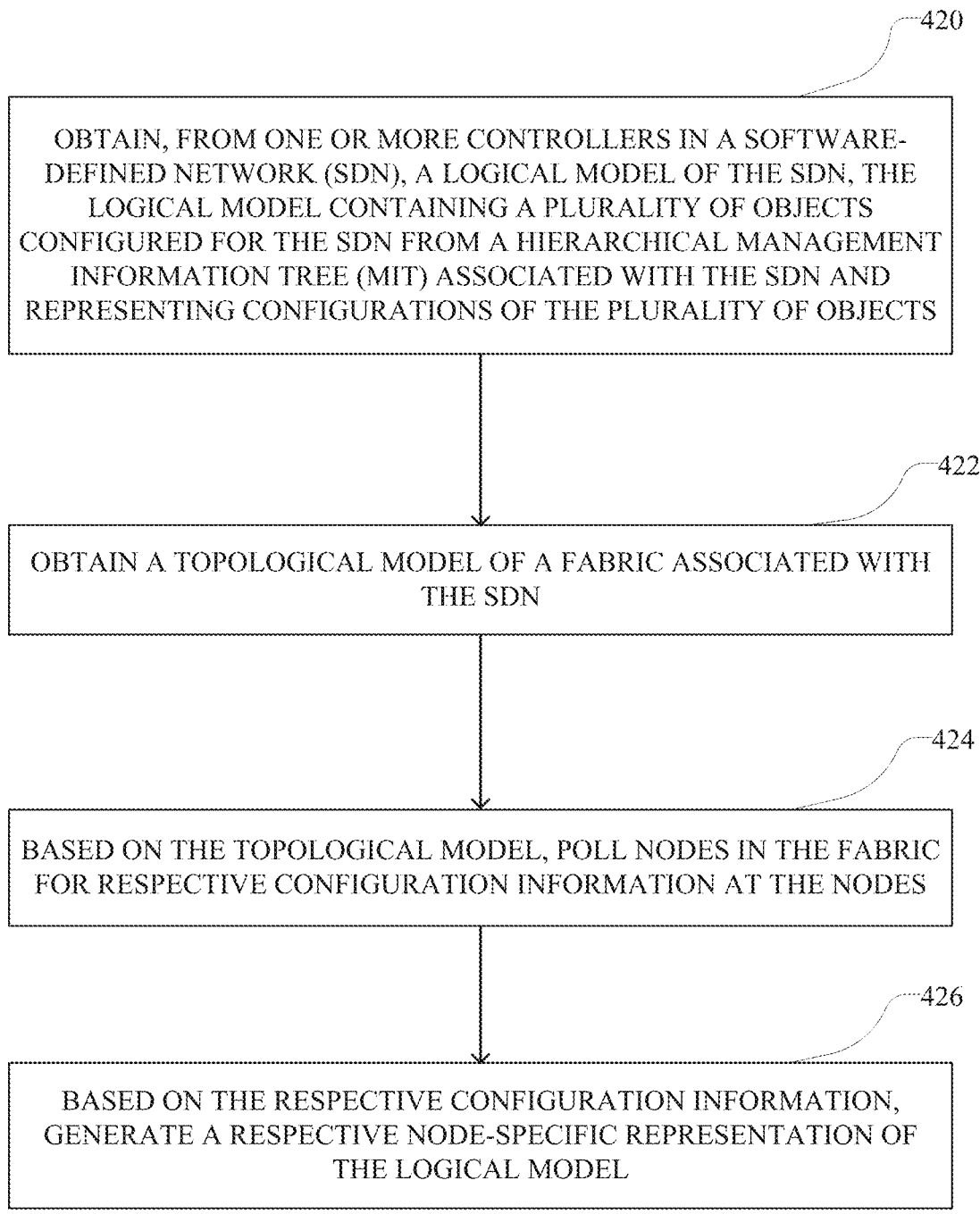
FIG. 4B illustrates an example method for obtaining a topological model of the network, collecting configurations from the nodes in the topological model, and generating a node-specific model.

The disclosure now turns to FIGS. 4A, 4B, and 4C, which illustrate example methods. FIG. 4A illustrates an example method for network assurance, FIG. 4B illustrates an example method for obtaining a topological model of the network, collecting configurations from the nodes in the topological model, and generating a node-specific model, and FIG. 4C illustrates an example method for obtaining a network-wide logical model of the network and generating a node-specific logical model based on the network-wide logical model. The methods are provided by way of example, as there are a variety of ways to carry out the methods. Additionally, while the example methods are illustrated with a particular order of blocks or steps, those of ordinary skill in the art will appreciate that FIGS. 4A-4C, and the blocks shown therein, can be executed in any order and can include fewer or more blocks than illustrated.

Each block shown in FIGS. 4A-4C represents one or more steps, processes, methods or routines in the methods. For the sake of clarity and explanation purposes, the blocks in FIGS. 4A-4C are described with reference to Assurance Appliance 300, Models 270A-B, 272, 274, 276, and Network Environment 100, as shown in FIGS. 1A-B, 2D, and 3A.

With reference to FIG. 4A, at step 400, Assurance Appliance 300 can collect data and obtain models associated with Network Environment 100. The models can include Models 270A-B, 272, 274, 276. The data can include fabric data (e.g., topology, switch, interface policies, application policies, EPGs, etc.), network configurations (e.g., BDs, VRFs, L2 Outs, L3 Outs, protocol configurations, etc.), security configurations (e.g., contracts, filters, etc.), service chaining configurations, routing configurations, and so forth. Other information collected or obtained can include, for example, network data (e.g., RIB/FIB, VLAN, MAC, ISIS, DB, BGP, OSPF, ARP, VPC, LLDP, MTU, QoS, etc.), rules and tables (e.g., TCAM rules, ECMP tables, etc.), endpoint dynamics (e.g., EPM, COOP EP DB, etc.), statistics (e.g., TCAM rule hits, interface counters, bandwidth, etc.).

At step 402, Assurance Appliance 300 can analyze and model the received data and models. For example, Assurance Appliance 300 can perform formal modeling and analysis, which can involve determining equivalency between models, including configurations, policies, etc.

At step 404, Assurance Appliance 300 can generate one or more smart events. Assurance Appliance 300 can generate smart events using deep object hierarchy for detailed analysis, such as Tenants, switches, VRFs, rules, filters, routes, prefixes, ports, contracts, subjects, etc.

At step 406, Assurance Appliance 300 can visualize the smart events, analysis and/or models. Assurance Appliance 300 can display problems and alerts for analysis and debugging, in a user-friendly GUI.

With reference to FIG. 4B, at step 420, Assurance Appliance 300 can obtain, from Controllers 116 in Network Environment 100, a logical model (e.g., L_Model 270A and/or LR_Model 270B) of the Network Environment 100. The logical model can contain a plurality of objects configured for the Network Environment 100 from a hierarchical management information tree (MIT), such as MIM 200, associated with the Network Environment 100 and represent configurations of the plurality of objects. The plurality of objects can correspond to manageable objects from the MIT, and the configurations can correspond to object properties and/or relationships defined based on the MIT.

At step 422, Assurance Appliance 300 can obtain a topological model of Fabric 120 in Network Environment 100. The topological model can represent the topology of the Fabric 120, including Leafs 104, Spines 102, Controllers 116, etc. Moreover, the topological model can include node identifiers, node configuration data, node addressing data, etc. Assurance Appliance 300 can use the topological model to identify the various nodes in the Fabric 120 and communicate with any of the nodes if necessary.

Based on the topological model, at step 424, Assurance Appliance 300 can poll nodes (e.g., Leafs 104 and Spines 102) in Fabric 120 for respective configuration information at the nodes. The respective configuration information can include rules, configurations, runtime state, models, policies, etc. Assurance Appliance 300 can specify what to be included in the respective configuration information.

In some examples, Assurance Appliance 300 can poll the nodes for configuration information such as rules at the nodes, configuration settings at the nodes, runtime state data at the nodes, models at the nodes, etc. In some examples, the models at the nodes can include concrete and/or hardware models. Thus, Assurance Appliance 300 can poll the nodes to obtain a respective concrete model (e.g., Ci_Model 274) and/or hardware model (e.g., Hi_Model 276) from the nodes. Assurance Appliance 300 can poll the nodes for various types of configuration information, such as VLANs, BDs, security policies, LLDP information, IP information, prefixes, fabric card information, RIB/FIB tables, security group tables, interface information, etc.

Based on the respective configuration information, at step 426, Assurance Appliance 300 can obtain or generate a respective node-specific representation of the logical model. The respective node-specific representation of the logical model can project the logical model to each respective node. For example, the respective node-specific representation of the logical model can include a respective Ci_Model 274 and/or Hi_Model 276. The respective node-specific representation of the logical model can include the portion of the logical model from the perspective of the specific node, including any configuration information in the logical model pertaining to that specific node. For example, the respective node-specific representation of the logical model can be a node-specific logical model for that specific node, which can include those objects and/or configurations from the logical model deployed and/or available at the node.

Referring to FIG. 4C, at step 440 Assurance Appliance 300 can obtain, from Controllers 116, one or more logical models associated with Network Environment 100. The one or more logical models can include objects and configurations stored at Controllers 116 for Network Environment 100. For example, the logical models can be objects and object properties defined at Controllers 116 for Network Environment 100 based on the objects and object properties available for configuration or definition based on a hierarchical MIT (e.g., MIM 200) associated with Network Environment 100 (e.g., an MIT associated with an ACI network).

Based on the one or more logical models and the configurations, at step 442, Assurance Appliance 300 can generate a network-wide logical model (e.g., L_Model 270A) of Network Environment 100. The network-wide logical model can represent a network-wide configuration of objects associated with a hierarchical MIT (e.g., MIM 200) associated with the Network Environment 100. In some examples, Assurance Appliance 300 can combine logical models from various Controllers 116 in the Network Environment 100 to construct a single, network-wide logical model for the Network Environment 100.

At step 444, Assurance Appliance 300 can generate, based on the network-wide logical model, a rendered (or runtime) logical model (e.g., LR_Model 270B) of the Network Environment 100. The rendered logical model can include a runtime state of the Network Environment 100. The rendered logical model can be formatted in a manner that can be read, executed, rendered, and/or interpreted by nodes in Fabric 120, such as Leafs 104 and Spines 102. In some cases, the rendered logical model can be a flat model of the network-wide logical model, and can contain objects and/or identifiers that are understood by the nodes in Fabric 120, such as JSON objects, hardware plane identifiers, policy group tags, key/value pairs, etc. Moreover, the rendered logical model can be a network-wide logical model for the Network Environment 100 formatted for rendering and/or compilation at the nodes in the Fabric 120, and/or including runtime state data collected for the Network Environment 100.

Based on the rendered logical model, at step 446, Assurance Appliance 300 can generate, for one or more nodes in the Network Environment 100 (e.g., Leafs 104 and/or Spines in Fabric 120), a respective device-specific representation of the network-wide logical model (e.g., Li_Model 272). The respective device-specific representation can be generated by rendering, compiling, or propagating the rendered logical model onto a respective node (e.g., Leaf N 104) in order to project the network-wide logical model onto that respective node. In other words, the respective device-specific representation can convey how the network-wide logical model is perceived at the respective node. For example, the respective device-specific representation can be a switch-specific logical model that represents the network-wide logical model as perceived, projected, applicable, etc., to that particular switch, including any configurations in the network-wide logical model that are rendered, compiled, and/or deployed at the particular switch.

Figure 5A:
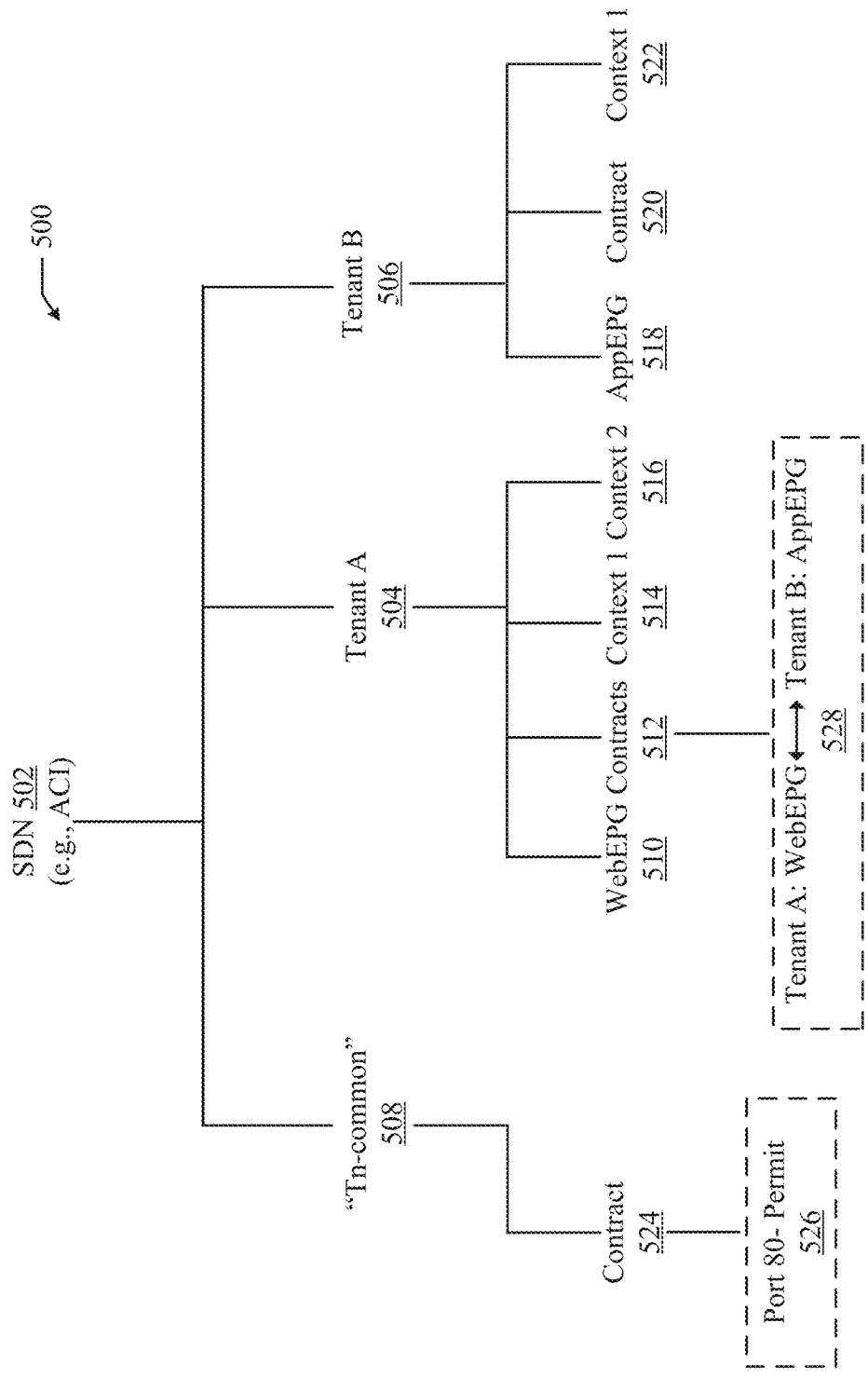
Figure 5B:
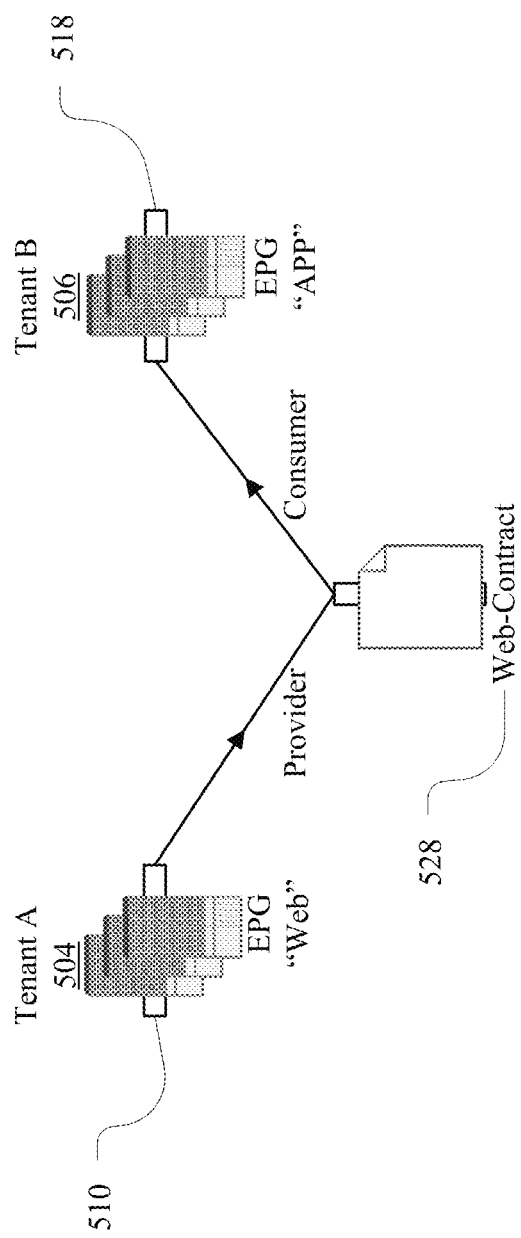

With reference to FIGS. 5A-C, the disclosure now turns to a description of example contracts, objects, and configurations defined for an SDN network, such as Network Environment 100. FIG. 5A illustrates a schematic diagram of Graphical Representation 500 for contract and object configurations in an SDN network (e.g., Network Environment 100). The contract and object configurations can depict communication policies and object relationships defined in an SDN network via one or more contracts and objects from a corresponding object model, such as MIM 200. The contract scope can define the scope of a contract between two or more participating entities or EPGs. Example contract scopes can include Private Network or Context (e.g., VRF), Tenant, Application Profile, and Global. The Global scope can be applied to any EPGs or entities throughout the fabric.

In the example Graphical Representation 500, the SDN network (e.g., Network Environment 100) is represented by SDN 502. Here, SDN 502 is the root node in Graphical Representation 500 and can represent one or more SDN network frameworks, such as ACI and any other SDN network frameworks. For illustration purposes, SDN 502 can represent an ACI framework and/or portion implemented in Network Environment 100.

SDN 502 includes one or more child nodes, represented by Tenant Objects 504, 506, 508 in this example. It should be noted that while Tenant Objects 504, 506, 508 are illustrated as child nodes from SDN 502, other configurations can include other types of objects configured as child nodes from SDN 502, exclude Tenant Objects 504, 506, 508 from Graphical Representation 500, and/or include tenant objects in lower levels of the taxonomy represented under SDN 502.

Tenant Objects 504, 506, 508 represent particular tenants or tenant containers configured in the SDN network. Tenant Objects 504, 506, 508 can be provided by a system (e.g., one or more Controllers 116), or configured by a user, such as the fabric administrator. In this example, Tenant Object 504 corresponds to Tenant Object A, Tenant Object 506 corresponds to Tenant Object B, and Tenant Object 508 corresponds to the tenant "Common". The common tenant contains policies that govern the operation of resources and/or contracts accessible to all tenants, such as firewalls, load balancers, Layer 4 to Layer 7 services, intrusion detection appliances, and so on. As referenced herein, the prefix "Tn" represents Tenant. For example, "Tn-common" represents the common tenant.

Tenant Objects 504, 506, 508 can also have child nodes representing other objects in SDN 502. For example, Contract 524 can be configured for, or applied to, the common tenant, Tenant Object 508. In this example, Contract 524 includes Policy 526 which permits traffic on port 80 (i.e., HTTP traffic). Tenant Object 504 includes child nodes 510, 512, 514, 516. Child nodes 510, 512, 514, 516 include WebEPG Object 510, which depicts an EPG container or attribute for one or more Web applications associated with Tenant A, Contracts 512, which represents one or more contracts defined for Tenant A, and Context Objects 514, 516, which represent Private Networks or Contexts (e.g., VRF instances), such as Context 1 and Context 2, associated with Tenant A.

Tenant Object 506 can include child nodes 518, 520, 522. Child nodes 518, 520, 522 include AppEPG 518 which depicts an EPG container or attribute for an application EPG associated with Tenant Object 506 (i.e., Tenant B), Contract 520 which represents one or more contracts defined for Tenant Object 506 (i.e., Tenant B), and Context Object 522 which represents Context 1 configured for Tenant Object 506 (i.e., Tenant B).

Graphical Representation 500 also illustrates an example contract, Contract 528 from Contracts 512, defined for Tenant Object 504 (i.e., Tenant A). As previously noted, contracts can be used to define or control traffic flow between objects in the SDN, such as communications between EPGs in the SDN. In this example, Contract 528 defines communications or traffic between WebEPG Object 510 in Tenant Object 504 (i.e., Tenant A) and AppEPG Object 518 in Tenant Object 506 (i.e., Tenant B). Thus, Contract 528 may permit communications between web services associated with WebEPG Object 510 in Tenant Object 504 (i.e., Tenant A) and applications or application services associated with AppEPG Object 518 in Tenant Object 506 (i.e., Tenant B).

Contracts can include various configurable properties, such as a name, priority (e.g., QoS), codepoint (e.g., DSCP codepoint), scope (e.g., Application Profile, Private Network or Context, Tenant, Global, EPG, etc.), description, etc. Moreover, a contract can include various elements for defining communication parameters associated with the contract, such as labels, aliases, filters (e.g., Layer 2 through Layer 4 attributes for classifying traffic), subjects (e.g., a group of filters for a particular application or service), actions (e.g., permit traffic, mark traffic, redirect traffic, copy traffic, block traffic, log traffic, etc.), etc.

In some cases, contract properties can define whether an EPG or service associated with a contract is a consumer of the contract or a provider of the contract. For example, EPGs can provide, consume, or both provide and consume contracts. A contract provider can be the provider of a service, such as a web service, and a contract consumer can be the consumer of a service provided by someone else, such as the consumer of the web service. Contract properties can also be used to define traffic flow direction, such as bi-directional, consumer to provider, provider to consumer, etc.

For example, when a contract is associated with an EPG, that EPG can be defined as a provider or consumer of the contract. To illustrate, assume WebEPG Object 510 provides a web service (e.g., HTTP) that needs to be accessed by AppEPG Object 518. In this case, WebEPG Object 510 can be set as the provider of the contract (and its associated filter) allowing web traffic, and AppEPG Object 518 can be set as the consumer of the contract.

FIG. 5B illustrates a representation of Contract 528 (e.g., Web-Contract) between WebEPG Object 510 associated with Tenant Object 504 (i.e., Tenant A) and AppEPG Object 518 associated with Tenant Object 506 (i.e., Tenant B). In Contract 528, WebEPG Object 510 is defined as a provider of Contract 528 and AppEPG Object 518 is defined as a consumer of Contract 528. Contract 528 can be implemented to allow applications associated with WebEPG Object 510 to provide web traffic or services to applications associated with AppEPG Object 518.

When defining a contract, a scope of the contract can be defined to provide a level of enforcement for the contract or define an accessibility of the contract. Example contract scopes can include Private Network or Context (e.g., VRF), Application Profile, Tenant, Global, etc. The scope of a contract can define the flow of traffic and/or level of policy enforcement between the various entities, such as EPGs, within the SDN.

FIG. 5C illustrates an example configuration of objects in an SDN network, such as Network Environment 100. The configuration of objects in this example can include Tenant Objects 562A-C, Context Objects 564A-C, BD Objects 566A-B, EPG Objects 568A-E, Contracts, and contract properties, such as Contract Scope 574, Provider Attributes 570 and Consumer Attributes 572. Such configuration of objects can define the flow of traffic between entities, such as applications, devices, and tenants, as well as security and enforcement policies.

In this example, Tenant Object 562A is defined as Tenant IT Shared, Tenant Object 562B is defined as Tenant Employee, and Tenant Object 562C is defined as Tenant Finance. Tenant Object 562A (i.e., Tenant IT Shared) is set as a Provider 570 of the contract while Tenant Object 562B (i.e., Tenant Employee) and Tenant Object 562C (i.e., Tenant Finance) are set as Consumers 572 of the contract.

Tenant Object 562A has a Context Object 564A set to VRF Shared, a BD Object 566A set to Shared-BD, and an EPG Object 568A for EPG-SSO. Tenant Object 562B has a Context Object 564B set to VRF Shared, a BD Object 566B set to VDI-BD, and an EPG Object 568B set to EPG-VDI. Tenant Object 562C has a Context 564C set to VRF Internal, does not have a corresponding BD Object configured, and includes EPG Objects 568C-E set to EPG-Web, EPG-APP, and EPG-DB, respectively.

The Contract Scope 574 is set to Context (VRF) between Provider 570 and Consumer(s) 572. As previously illustrated, EPG-SSO associated with EPG Object 568A of Tenant Object 562A, which is set as Provider 570, has the same context (i.e., Context Object 564A is set to VRF Shared) as EPG-VDI associated with EPG Object 568B of Tenant Object 562B (i.e., Context Object 564B is set to VRF Shared), which is set as Consumer 572. However, EPG-Web, EPG-App, and EPG-DB respectively associated with EPG Objects 568C-E of Tenant Object 562C, which are set as Consumers 572, have a different context (i.e., Context Object 564C is set to VRF Internal) than EPG-SSO associated with EPG Object 568A and EPG-VDI associated with EPG Object 568B. Accordingly, in this example, communications between EPG-SSO associated with EPG Object 568A and EPG-VDI associated with EPG Object 568B will be permitted, as they have a matching context (i.e., VRF Shared defined for their Context Objects 564A and 564B). However, communications between EPG-SSO associated with EPG Object 568A and EPG-Web, EPG-App, and EPG-DB, respectively associated with EPG Objects 568C-E, will not be permitted, as the Contract Scope 574 between Provider 570 and Consumers 572 is set to Context and the Context Objects 564A and 564C in this example are different.

As illustrated above, the Contract Scope 574 is incorrectly set as between EPG-SSO associated with EPG Object 568A and EPG-Web, EPG-App, and EPG-DB, respectively associated with EPG Objects 568C-E, and will not permit communications between them. This can be fixed by changing the Contract Scope 574 to GLOBAL or changing the Context Objects 564A and 564C to match. A contract scope of Global would allow the associated contract to be applied to all of the EPGs associated with the contract, namely, EPGs 568A through 568E.

In another example, a network operator creates EPG1 in BD1 (subnet 10.1.1.1/16) and VRF1 for Tenant1, EPG2 in BD2 (subnet 10.1.1.1/24) and VRF2 for Tenant2. The network operator also creates a contract C1 with a scope of VRF in Tenant2. The network operator attaches EPG1 as Provider and EPG2 as Consumer of the contract C1. However, due to scoping rules, EPG1 and EPG2 will not be bound even though the customer may think that the contract C1 is deployed. Here, the scope should be changed to put the Provider and Consumer on the same VRF or set the scope of the Consumer to Global.

In yet another example, assume two tenants (e.g., IT and Employee) have two separate VRFs, and one tenant is set as Provider and includes a Web-EPG while the second tenant is set as Consumer and includes an VDI-EPG. The two tenants (IT and Employee) have separate BDs (e.g., Shared-BD and VDI-BD), but the BDs have the same network addresses, 10.0.0.1/24. However, the contract scope has an incorrect setting (e.g., scopes do not match or the contract does not have a Consumer attached to it). Thus, the contract scope of the Consumer can be fixed by changing it to Global. However, after the contract scope is fixed by changing it to Global, forwarding decisions will still be impacted by the separate BDs having the same network addresses.

Assurance Appliance 300 can perform a policy analysis to identify the IP subnet conflict, and generate an event, such as "OVERLAPPING SUBNETS ACROSS VRFS DUE TO CONTRACT", to indicate that the IP subnet conflict has occurred. In order to fix this IP subnet conflict, the IP address subnets can be modified so they are not overlapping.

Figure 6:
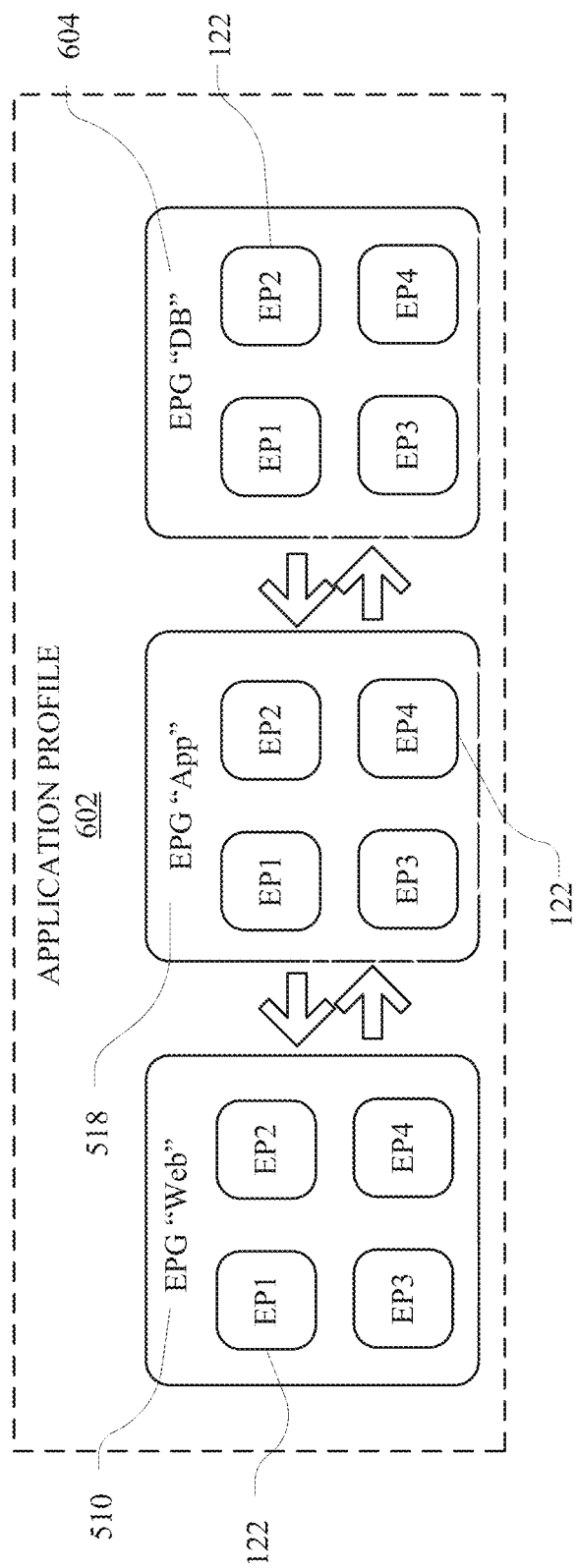
FIG. 6 illustrates an example configuration of an application profile object in a network.

FIG. 6 illustrates an example Application Profile 602 configured to include EPG 510, EPG 518, and EPG 604. In this example, EPG 510, EPG 518, and EPG 604 include WebEPG, AppEPG, and DBEPG, respectively. Thus, the Application Profile 602 includes WebEPG, AppEPG, and DBEPG. Moreover, EPG 510, EPG 518, and EPG 604 include respective EPs 122, which can communicate between EPGs based on one or more contracts and the Application Profile 602.

Application Profile 602 can be used to associate EPG 510, EPG 518, EPG 604, and the respective EPs 122 in EPG 510, EPG 518, EPG 604, as well as any corresponding filters, contracts, actions, etc. Application Profile 602 can also be used to define the scope of a contract. Thus, with the scope of the contract set to Application Profile, a provider attached to the contract having Application Profile 602 will be able to communicate with a consumer attached to the contract also having Application Profile 602.

The disclosure now turns to FIGS. 7 and 8, which illustrate example computing and network devices, such as switches, routers, load balancers, client devices, and so forth.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

FIG. 8 illustrates an example network device 800 suitable for performing switching, routing, load balancing, and other networking operations. Network device 800 includes a central processing unit (CPU) 804, interfaces 802, and a bus 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, etc.) also forms part of CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 8 is one specific network device of the present invention, it is by no means the only network device architecture on which the present invention can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the bus 810, to exchange data and signals and coordinate various types of operations by the network device 800, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
    obtaining, by an assurance appliance, from one or more controllers in a software-defined network, one or more logical models including configurations stored at the one or more controllers;
    generating, by the assurance appliance, a network-wide logical model of the software-defined network from the one or more logical models, the network-wide logical model containing a plurality of objects configured for the software-defined network from a hierarchical management information tree associated with the software-defined network and representing configurations of the plurality of objects, the hierarchical management information tree defining manageable objects and object properties for the software-defined network, the plurality of objects corresponding to at least some of the manageable objects;
    obtaining, by the assurance appliance, a topological model of a fabric associated with the software-defined network;
    based on the topological model, polling, by the assurance appliance, nodes in the fabric for respective configuration information at the nodes; and
    based on the respective configuration information, generating, by the assurance appliance, a respective node-specific representation of the network-wide logical model, the respective node-specific representation projecting the network-wide logical model to each respective node, wherein the respective node-specific representation of a node comprises at least a portion of the network-wide logical model from a perspective of the node and configuration information in the network-wide logical model pertaining to the node.

2. The method of claim 1, wherein the respective node-specific representation of the logical model comprises a node-specific logical model, the node-specific logical model comprising a first portion of the plurality of objects and a second portion of the configurations of the plurality of objects, the first portion of the plurality of objects and the second portion of the configurations pertaining to the respective node associated with the node-specific logical model.

3. The method of claim 2, further comprising:
    collecting runtime state data associated with the network; and
    modifying the logical model based on the runtime state data to yield a logical runtime model, wherein the respective node-specific representation of the logical model comprises a respective node-specific representation of the logical runtime model.

4. The method of claim 2, wherein polling the nodes further comprises obtaining, from each respective node, at least one of a respective concrete model and a respective hardware model, wherein the respective concrete model comprises the node-specific logical model as rendered by software on the respective node, and wherein the respective hardware model comprises the node-specific logical model as rendered by a hardware storage device on the respective node.

5. The method of claim 2, wherein the plurality of objects comprises a first set of the manageable objects, and wherein the configurations of the plurality of objects comprise respective parameters defined for a second set of the object properties, the second set of the object properties corresponding to the first set of the manageable objects.

6. The method of claim 2, wherein the nodes comprise switches in the fabric, and wherein the plurality of objects comprises at least one of contracts, tenants, endpoint groups, contexts, subjects, filters, entries.

7. The method of claim 2, wherein the first portion of the plurality of objects and the second portion of the configurations pertaining to the respective node comprise those of the plurality of objects and the configurations deployed at the respective node.

8. A system comprising:
one or more processors; and
at least one computer-readable storage medium having stored therein instructions which, when executed by the one or more processors, cause the system to:
obtain, from one or more controllers in a software-defined network, one or more logical models including configurations stored at the one or more controllers;
generate a network-wide logical model of the software-defined network from the one or more logical models, the network-wide logical model containing a plurality of objects configured for the software-defined network from a hierarchical management information tree associated with the software-defined network and representing configurations of the plurality of objects, the hierarchical management information tree defining manageable objects and object properties for the software-defined network, the plurality of objects corresponding to at least some of the manageable objects;
obtain a topological model of a fabric associated with the software-defined network;
based on the topological model, poll nodes in the fabric for respective configuration information at the nodes; and
based on the respective configuration information, generate a respective node-specific representation of the network-wide logical model, the respective node-specific representation projecting the network-wide logical model to each respective node, wherein the respective node-specific representation of a node comprises at least a portion of the network-wide logical model from a perspective of the node and configuration information in the network-wide logical model pertaining to the node.

9. The system of claim 8, wherein the respective node-specific representation of the logical model comprises a node-specific logical model, the node-specific logical model comprising a first portion of the plurality of objects and a second portion of the configurations of the plurality of objects, the first portion of the plurality of objects and the second portion of the configurations pertaining to the respective node associated with the node-specific logical model.

10. The system of claim 9, wherein the at least one computer-readable storage medium stores additional instructions which, when executed by the one or more processors, cause the system to:
collect runtime state data associated with the network; and
modify the logical model based on the runtime state data to yield a logical runtime model, wherein the respective node-specific representation of the logical model comprises a respective node-specific representation of the logical runtime model.

11. The system of claim 9, wherein the first portion of the plurality of objects and the second portion of the configurations pertaining to the respective node comprise those of the plurality of objects and the configurations deployed at the respective node.

12. The system of claim 8, wherein polling the nodes further comprises obtaining, from each respective node, at least one of a respective concrete model and a respective hardware model, wherein the respective concrete model comprises the node-specific logical model as rendered by software on the respective node, and wherein the respective hardware model comprises the node-specific logical model as rendered by a hardware storage device on the respective node.

13. The system of claim 8, wherein the plurality of objects comprises a first set of the manageable objects, and wherein the configurations of the plurality of objects comprise respective parameters defined for a second set of the object properties, the second set of the object properties corresponding to the first set of the manageable objects.

14. The system of claim 8, wherein the nodes comprise switches in the fabric, and wherein the plurality of objects comprises at least one of contracts, tenants, endpoint groups, contexts, subjects, filters, entries.

15. A non-transitory computer-readable storage medium comprising:
instructions stored therein instructions which, when executed by one or more processors, cause the one or more processors to:
obtain, from one or more controllers in a software-defined network, one or more logical models including configurations stored at the one or more controllers;
generate a network-wide logical model of the software-defined network from the one or more logical models, the network-wide logical model containing a plurality of objects configured for the software-defined network from a hierarchical management information tree associated with the software-defined network and representing configurations of the plurality of objects, the hierarchical management information tree defining manageable objects and object properties for the software-defined network, the plurality of objects corresponding to at least some of the manageable objects;
obtain a topological model of a fabric associated with the software-defined network;
based on the topological model, poll nodes in the fabric for respective configuration information at the nodes; and
based on the respective configuration information, generate a respective node-specific representation of the network-wide logical model, the respective node-specific representation projecting the network-wide logical model to each respective node, wherein the respective node-specific representation of a node comprises at least a portion of the network-wide logical model from a perspective of the node and configuration information in the network-wide logical model pertaining to the node.

16. The non-transitory computer-readable storage medium of claim 15, wherein the respective node-specific representation of the logical model comprises a node-specific logical model, the node-specific logical model comprising a first portion of the plurality of objects and a second portion of the configurations of the plurality of objects, the first portion of the plurality of objects and the second portion of the configurations pertaining to the respective node associated with the node-specific logical model.

17. The non-transitory computer-readable storage medium of claim 16, storing additional instructions which, when executed by the one or more processors, cause the one or more processors to:
  collect runtime state data associated with the network; and
  modify the logical model based on the runtime state data to yield a logical runtime model, wherein the respective node-specific representation of the logical model comprises a respective node-specific representation of the logical runtime model.

18. The non-transitory computer-readable storage medium of claim 16, wherein the first portion of the plurality of objects and the second portion of the configurations pertaining to the respective node comprise those of the plurality of objects and the configurations deployed at the respective node, wherein the nodes comprise switches in the fabric, and wherein the plurality of objects comprises at least one of contracts, tenants, endpoint groups, contexts, subjects, filters, entries.

* * * * *